(12) United States Patent
Yamamoto et al.

(10) Patent No.: US 11,075,401 B2
(45) Date of Patent: *Jul. 27, 2021

(54) ELECTROLYTE, BATTERY, AND ELECTRONIC APPARATUS

(71) Applicant: SEIKO EPSON CORPORATION, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,563

(22) Filed: Feb. 25, 2020

(65) Prior Publication Data

US 2020/0194824 A1    Jun. 18, 2020

Related U.S. Application Data

(63) Continuation of application No. 16/277,027, filed on Feb. 15, 2019, now Pat. No. 10,615,451.

(30) Foreign Application Priority Data

Feb. 19, 2018    (JP) ............................... JP2018-026674

(51) Int. Cl.
*H01M 10/0525* (2010.01)
*H01M 10/0562* (2010.01)
*H01M 10/04* (2006.01)

(52) U.S. Cl.
CPC ..... *H01M 10/0525* (2013.01); *H01M 10/049* (2013.01); *H01M 10/0562* (2013.01); *H01M 2300/0088* (2013.01)

(58) Field of Classification Search
CPC ......... H01M 10/0562; H01M 10/0525; H01M 10/049
See application file for complete search history.

(56) References Cited

U.S. PATENT DOCUMENTS

| | | | |
|---|---|---|---|
| 9,368,775 B2 * | 6/2016 | Visco | H01G 11/06 |
| 10,347,937 B2 | 7/2019 | Beck et al. | |
| 2013/0230778 A1 | 9/2013 | Saimen et al. | |
| 2014/0295287 A1 | 10/2014 | Eisele et al. | |
| 2014/0302399 A1 | 10/2014 | Saimen et al. | |
| 2015/0056519 A1 | 2/2015 | Ohta et al. | |
| 2016/0079597 A1 * | 3/2016 | Fujiki | H01M 10/0562 429/323 |
| 2016/0104891 A1 | 4/2016 | Holme | |
| 2016/0133990 A1 | 5/2016 | Schwanz et al. | |
| 2016/0211498 A1 * | 7/2016 | Kim | H01M 4/13 |
| 2016/0218349 A1 * | 7/2016 | Hasegawa | H01M 4/62 |
| 2016/0294016 A1 | 10/2016 | Asai et al. | |

(Continued)

FOREIGN PATENT DOCUMENTS

| | | |
|---|---|---|
| JP | 2009-215130 A | 9/2009 |
| JP | 2013-134852 A | 7/2013 |

(Continued)

*Primary Examiner* — Matthew J Merkling
(74) *Attorney, Agent, or Firm* — Oliff PLC

(57) ABSTRACT

A composite body includes an electrolyte which contains Li, La, Zr, O, and Ga; and an active material coated with barium titanate ($BaTiO_3$) or lithium niobate ($LiNbO_3$).

6 Claims, 15 Drawing Sheets

(56) References Cited

U.S. PATENT DOCUMENTS

| | | | | |
|---|---|---|---|---|
| 2017/0170515 A1* | 6/2017 | Yushin | ............... | H01M 10/052 |
| 2018/0062200 A1* | 3/2018 | Yamamoto | .............. | H01M 4/13 |
| 2018/0175446 A1 | 6/2018 | Nishizaki et al. | | |
| 2018/0294520 A1* | 10/2018 | Takano | ............. | C04B 35/62635 |

FOREIGN PATENT DOCUMENTS

| | | | |
|---|---|---|---|
| JP | 2013-149493 | A | 8/2013 |
| JP | 2013-182836 | A | 9/2013 |
| JP | 2014-212103 | A | 11/2014 |
| JP | 2015-041573 | A | 3/2015 |
| JP | 2015-050071 | A | 3/2015 |
| JP | 2015-050072 | A | 3/2015 |
| JP | 2015-176857 | A | 10/2015 |
| JP | 2016-056054 | A | 4/2016 |

\* cited by examiner

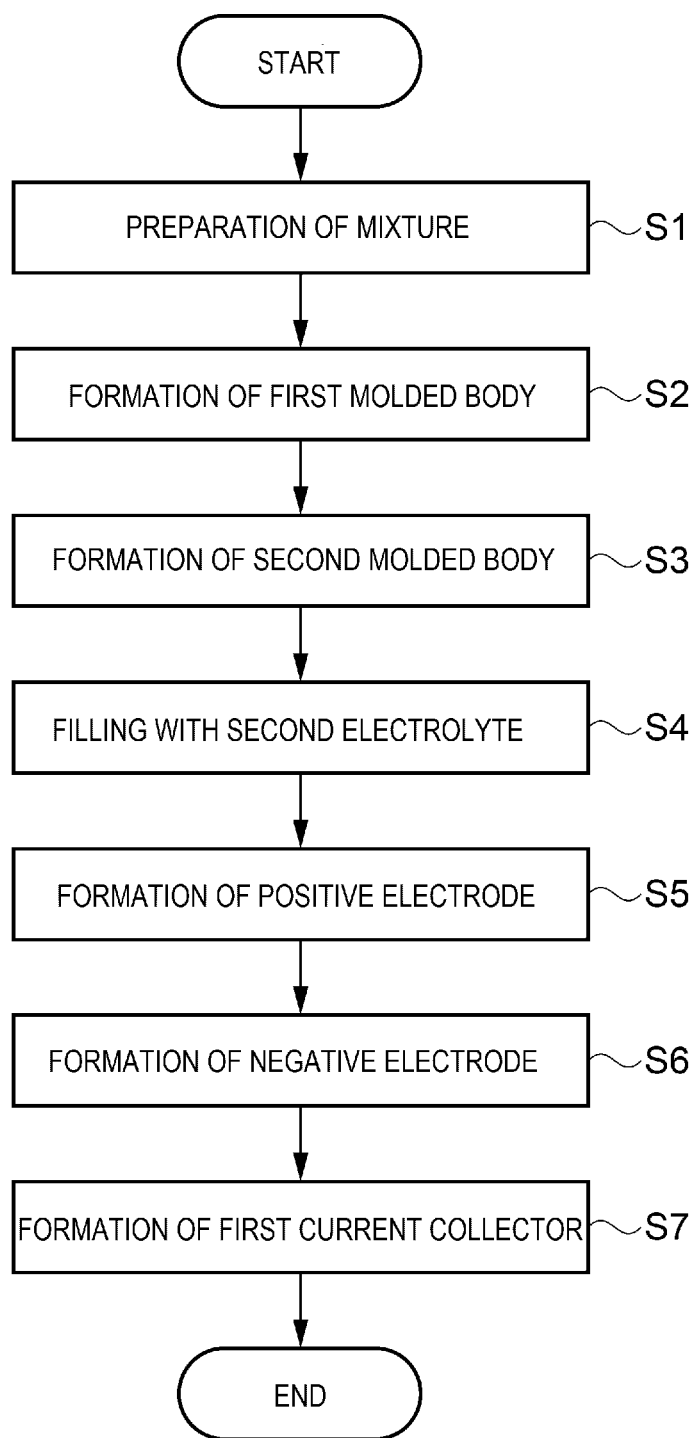

FIG. 7

| | ELECTROLYTE | | | COATING OF ACTIVE MATERIAL |
|---|---|---|---|---|
| | FIRST ELECTROLYTE PORTION | | SECOND ELECTROLYTE PORTION | |
| | COMPOSITION | FIRING CONDITIONS | | |
| EXAMPLE 1 | $Li_{5.5}Ga_{0.5}La_{2.99}Nd_{0.01}Zr_2O_{12}$ | 900°C×8H | LCBO | WITHOUT |
| EXAMPLE 2a | $Li_{5.5}Ga_{0.5}La_{2.96}Nd_{0.04}Zr_2O_{12}$ | 800°C×9H | LCBO | WITHOUT |
| EXAMPLE 2b | | 900°C×8H | LCBO | WITHOUT |
| EXAMPLE 2c | | 1000°C×8H | LCBO | $LiNbO_3$ |
| EXAMPLE 3a | $Li_{6.7}Ga_{0.1}La_{2.95}Nd_{0.05}Zr_2O_{12}$ | 900°C×8H | LCBO | WITHOUT |
| EXAMPLE 3b | | 900°C×8H | (NONE) | WITHOUT |
| EXAMPLE 4 | $Li_4Ga_1La_{2.95}Nd_{0.05}Zr_2O_{12}$ | 900°C×8H | LCBO | WITHOUT |
| EXAMPLE 5a | $Li_{5.2}Ga_{0.6}La_{2.8}Nd_{0.2}Zr_2O_{12}$ | 800°C×9H | LCBO | WITHOUT |
| EXAMPLE 5b | | 900°C×8H | LCBO | WITHOUT |
| EXAMPLE 5c | | 1000°C×8H | LCBO | $BaTiO_3$ |
| COMPARATIVE EXAMPLE 1a | $Li_{5.5}Ga_{0.5}La_{2.79}Nd_{0.21}Zr_2O_{12}$ | 900°C×8H | LCBO | WITHOUT |
| COMPARATIVE EXAMPLE 1b | | 900°C×8H | (NONE) | WITHOUT |
| COMPARATIVE EXAMPLE 2 | $Li_{5.5}Ga_{0.5}La_3Zr_2O_{12}$ | 900°C×8H | LCBO | WITHOUT |
| COMPARATIVE EXAMPLE 3a | $Li_{5.5}Ga_{0.5}La_{2.96}Ca_{0.04}Zr_2O_{12}$ | 800°C×9H | LCBO | WITHOUT |
| COMPARATIVE EXAMPLE 3b | | 900°C×8H | LCBO | WITHOUT |
| COMPARATIVE EXAMPLE 4 | $Li_7La_3Zr_2O_{12}$ | 900°C×8H | LCBO | WITHOUT |

FIG. 9

| | LITHIUM ION CONDUCTIVITY [S/cm] | | | CRYSTAL SYSTEM (RAMAN SCATTERING ANALYSIS) | IMPURITIES (XRD ANALYSIS) |
|---|---|---|---|---|---|
| | GRAIN BULK CONDUCTIVITY | GRAIN BOUNDARY CONDUCTIVITY | TOTAL ION CONDUCTIVITY | | |
| EXAMPLE 1 | $2.9 \times 10^{-4}$ | $2.5 \times 10^{-4}$ | $1.3 \times 10^{-4}$ | c | ABSENT |
| EXAMPLE 2a | $2.1 \times 10^{-4}$ | $2.0 \times 10^{-4}$ | $1.0 \times 10^{-4}$ | c | ABSENT |
| EXAMPLE 2b | $3.0 \times 10^{-4}$ | $2.6 \times 10^{-4}$ | $1.4 \times 10^{-4}$ | c | ABSENT |
| EXAMPLE 2c | $5.2 \times 10^{-4}$ | $5.2 \times 10^{-4}$ | $2.6 \times 10^{-4}$ | c | ABSENT |
| EXAMPLE 3a | $2.8 \times 10^{-4}$ | $2.6 \times 10^{-4}$ | $1.3 \times 10^{-4}$ | c | ABSENT |
| EXAMPLE 4 | $2.7 \times 10^{-4}$ | $2.6 \times 10^{-4}$ | $1.3 \times 10^{-4}$ | c | ABSENT |
| EXAMPLE 5a | $2.0 \times 10^{-4}$ | $2.1 \times 10^{-4}$ | $1.0 \times 10^{-4}$ | c | ABSENT |
| EXAMPLE 5b | $3.0 \times 10^{-4}$ | $2.5 \times 10^{-4}$ | $1.4 \times 10^{-4}$ | c | ABSENT |
| EXAMPLE 5c | $5.5 \times 10^{-4}$ | $6.0 \times 10^{-4}$ | $2.9 \times 10^{-4}$ | c | ABSENT |
| COMPARATIVE EXAMPLE 1a | $2.8 \times 10^{-4}$ | $2.4 \times 10^{-4}$ | $1.3 \times 10^{-4}$ | c | PRESENT |
| COMPARATIVE EXAMPLE 2 | $1.6 \times 10^{-4}$ | $1.9 \times 10^{-4}$ | $1.7 \times 10^{-5}$ | c | ABSENT |
| COMPARATIVE EXAMPLE 3a | $1.0 \times 10^{-4}$ | $4.3 \times 10^{-4}$ | $3.0 \times 10^{-5}$ | t+c | ABSENT |
| COMPARATIVE EXAMPLE 3b | $2.0 \times 10^{-4}$ | $1.0 \times 10^{-4}$ | $6.7 \times 10^{-5}$ | c | ABSENT |
| COMPARATIVE EXAMPLE 4 | — | — | $2.7 \times 10^{-7}$ | t | ABSENT |

|  | TG-DTA MEASUREMENT RESULTS | | |
|---|---|---|---|
|  | TETRAGONAL CRYSTAL FORMATION TEMPERATURE | TETRAGONAL-CUBIC PHASE TRANSITION TEMPERATURE | MELTING POINT |
| EXAMPLE 2b | 714°C | 757°C | 1072°C |
| COMPARATIVE EXAMPLE 3b | 719°C | 805°C | 1077°C |

FIG. 12

| | CHARGE CONDITIONS | | CHARGE CAPACITY [µAh] | | DISCHARGE CONDITIONS | | DISCHARGE CAPACITY [µAh] | | DISCHARGE CAPACITY RETENTION |
|---|---|---|---|---|---|---|---|---|---|
| | CHARGE CURRENT [µA] | CHARGE RATE | 1ST CYCLE | 10TH CYCLE | DISCHARGE CURRENT [µA] | DISCHARGE RATE | 1ST CYCLE | 10TH CYCLE | |
| EXAMPLE 1 | 100 | 0.2C | 500 | 500 | 100 | 0.2C | 450 | 405 | 90% |
| EXAMPLE 2a | 100 | 0.2C | 500 | 500 | 100 | 0.2C | 450 | 405 | 90% |
| EXAMPLE 2b | 100 | 0.2C | 500 | 500 | 100 | 0.2C | 450 | 405 | 90% |
| EXAMPLE 2c | 250 | 0.5C | 500 | 500 | 250 | 0.5C | 475 | 450 | 95% |
| EXAMPLE 3a | 100 | 0.2C | 500 | 500 | 100 | 0.2C | 455 | 414 | 91% |
| EXAMPLE 3b | 100 | 0.2C | 500 | 500 | 100 | 0.2C | 450 | 405 | 90% |
| EXAMPLE 4 | 100 | 0.2C | 500 | 500 | 100 | 0.2C | 455 | 414 | 91% |
| EXAMPLE 5a | 100 | 0.2C | 500 | 500 | 100 | 0.2C | 450 | 405 | 90% |
| EXAMPLE 5b | 100 | 0.2C | 500 | 500 | 100 | 0.2C | 450 | 405 | 90% |
| EXAMPLE 5c | 500 | 1.0C | 500 | 500 | 500 | 1.0C | 475 | 450 | 95% |
| COMPARATIVE EXAMPLE 1a | 100 | 0.2C | 500 | 500 | 100 | 0.2C | 400 | 300 | 75% |
| COMPARATIVE EXAMPLE 1b | 100 | 0.2C | 500 | 500 | 100 | 0.2C | 390 | 270 | 69% |
| COMPARATIVE EXAMPLE 2 | 100 | 0.2C | 500 | 500 | 100 | 0.2C | 450 | 351 | 78% |
| COMPARATIVE EXAMPLE 3a | 100 | 0.2C | 500 | 500 | 100 | 0.2C | 200 | 100 | 50% |
| COMPARATIVE EXAMPLE 3b | 100 | 0.2C | 500 | 500 | 100 | 0.2C | 220 | 120 | 55% |
| COMPARATIVE EXAMPLE 4 | 100 | 0.2C | 500 | 500 | 100 | 0.2C | 5 | 0 | 0% |

ELECTROLYTE, BATTERY, AND ELECTRONIC APPARATUS

This is a Continuation of application Ser. No. 16/277,027 filed Feb. 15, 2019, which in turn claims the benefit of Japanese Patent Application No. 2018-026674, filed Feb. 19, 2018. The disclosure of the prior applications is hereby incorporated by reference herein in its entirety.

BACKGROUND

1. Technical Field

The present invention relates to an electrolyte, a battery, and an electronic apparatus.

2. Related Art

Heretofore, there has been known a battery using a compound having a garnet-type crystal structure as an inorganic electrolyte. For example, JP-A-2015-41573 (Patent Document 1) proposes a garnet-type ion conductive oxide, in which zirconium sites are partially substituted with niobium, lanthanum sites are partially substituted with calcium, and lithium sites are partially substituted with aluminum in lithium lanthanum zirconate having a garnet-type crystal structure, as an electrolyte which enables low-temperature sintering.

However, when firing is performed at a low temperature using the garnet-type ion conductive oxide described in Patent Document 1, sufficient sintering does not occur at an interface between crystal grains, and there is a problem that it is difficult to achieve both decrease in the grain boundary resistance of crystal grains and improvement of the lithium ion conduction property (total ion conductivity).

SUMMARY

An electrolyte according to an aspect of this application includes a crystalline first electrolyte portion which contains a lithium composite metal oxide represented by the following compositional formula (1).

$$(Li_{7-3x}Ga_x)(La_{3-y}Nd_y)Zr_2O_{12} \tag{1}$$

In the formula (1), x and y satisfy the following formulae: $0.1 \leq x \leq 1.0$ and $0.01 \leq y \leq 0.2$.

In the electrolyte, it is preferred that the electrolyte includes an amorphous second electrolyte portion which contains Li and is in contact with the first electrolyte portion.

In the electrolyte, it is preferred that the second electrolyte portion contains Li, B, and O.

A battery according to an aspect of this application includes a composite body which includes the electrolyte and an active material, an electrode on one side of the composite body, and a current collector on the other side of the composite body.

In the battery, it is preferred that the active material is a positive electrode active material containing Li.

An electronic apparatus according to an aspect of this application includes the battery.

A method for producing an electrolyte according to an aspect of this application includes preparing a mixture by mixing a plurality of types of raw materials containing elements constituting a lithium composite metal oxide represented by the following compositional formula (1), and forming a crystalline first electrolyte portion by subjecting the mixture to a heating treatment.

In the formula (1), x and y satisfy the following formulae: $0.1 \leq x \leq 1.0$ and $0.01 \leq y \leq 0.2$.

In the method for producing an electrolyte, it is preferred that the method includes dissolving the raw materials in a solvent, the mixture contains the solvent, and the heating treatment includes a first heating treatment in which the heating temperature is 500° C. or higher and 650° C. or lower, and a second heating treatment which is performed after the first heating treatment, and in which the heating temperature is 800° C. or higher and 1000° C. or lower.

In the method for producing an electrolyte, it is preferred that the method includes melting a second electrolyte containing Li, B, and O by heating in a state where the second electrolyte is brought into contact with the first electrolyte portion, and forming a second electrolyte portion which is in contact with the first electrolyte portion by cooling the melt of the second electrolyte.

A method for producing a battery according to an aspect of this application includes preparing a mixture by dissolving a plurality of types of raw materials containing elements constituting a lithium composite metal oxide represented by the following compositional formula (1) in a solvent, followed by mixing, forming a first molded body using an active material, forming a composite body which includes the first molded body and a crystalline first electrolyte portion obtained after a reaction by subjecting the mixture to a heating treatment in a state of being impregnated into the first molded body to cause a reaction, forming an electrode on one side of the composite body, and forming a current collector on the other side of the composite body.

$$(Li_{7-3x}Ga_x)(La_{3-y}Nd_y)Zr_2O_{12} \tag{1}$$

In the formula (1), x and y satisfy the following formulae: $0.1 \leq x \leq 1.0$ and $0.01 \leq y \leq 0.2$.

A method for producing a battery according to an aspect of this application includes preparing a mixture by dissolving a plurality of types of raw materials containing elements constituting a lithium composite metal oxide represented by the following compositional formula (1) in a solvent, followed by mixing, forming a first molded body using an active material, forming a second molded body which includes the first molded body and a crystalline first electrolyte portion obtained after a reaction by subjecting the mixture to a heating treatment in a state of being impregnated into the first molded body to cause a reaction, filling the second molded body with the melt of a second electrolyte containing Li, B, and O by melting the second electrolyte by heating in a state where the second electrolyte is brought into contact with the second molded body, forming a composite body which includes the first electrolyte portion, a second electrolyte portion, and the active material by cooling the second molded body filled with the melt of the second electrolyte, forming an electrode on one side of the composite body, and forming a current collector on the other side of the composite body.

$$(Li_{7-3x}Ga_x)(La_{3-y}Nd_y)Zr_2O_{12} \tag{1}$$

In the formula (1), x and y satisfy the following formulae: $0.1 \leq x \leq 1.0$ and $0.01 \leq y \leq 0.2$.

In the method for producing a battery, it is preferred that the heating treatment includes a first heating treatment in which the heating temperature is 500° C. or higher and 650° C. or lower, and a second heating treatment which is performed after the first heating treatment, and in which the heating temperature is 800° C. or higher and 1000° C. or lower.

A method for producing a battery according to an aspect of this application includes preparing a mixture by mixing a plurality of types of raw materials containing elements constituting a lithium composite metal oxide represented by the following compositional formula (1), producing a calcined body by subjecting the mixture to a first heating treatment, preparing a mixed body by mixing the calcined body with an active material, forming a composite body which includes a crystalline first electrolyte portion and the active material by molding the mixed body, followed by performing a second heating treatment, forming an electrode on one side of the composite body, and forming a current collector on the other side of the composite body.

$$(Li_{7-3x}Ga_x)(La_{3-y}Nd_y)Zr_2O_{12} \qquad (1)$$

In the formula (1), x and y satisfy the following formulae: $0.1 \leq x \leq 1.0$ and $0.01 \leq y \leq 0.2$.

A method for producing a battery according to an aspect of this application includes preparing a mixture by mixing a plurality of types of raw materials containing elements constituting a lithium composite metal oxide represented by the following compositional formula (1), producing a calcined body by subjecting the mixture to a first heating treatment, preparing a mixed body by mixing the calcined body with an active material, producing a molded material by molding the mixed body, followed by performing a second heating treatment, filling the molded material with the melt of a second electrolyte containing Li, B, and O by melting the second electrolyte by heating in a state where the second electrolyte is brought into contact with the molded material, forming a composite body which includes a crystalline first electrolyte portion, a second electrolyte portion, and the active material by cooling the molded material filled with the melt of the second electrolyte, forming an electrode on one side of the composite body, and forming a current collector on the other side of the composite body.

$$(Li_{7-3x}Ga_x)(La_{3-y}Nd_y)Zr_2O_{12} \qquad (1)$$

In the formula (1), x and y satisfy the following formulae: $0.1 \leq x \leq 1.0$ and $0.01 \leq y \leq 0.2$.

In the method for producing a battery, it is preferred that in the first heating treatment, the heating temperature is 500° C. or higher and 650° C. or lower, and in the second heating treatment, the heating temperature is 800° C. or higher and 1000° C. or lower.

BRIEF DESCRIPTION OF THE DRAWINGS

The invention will be described with reference to the accompanying drawings, wherein like numbers reference like elements.

FIG. 5 is a process flowchart showing a method for producing a lithium battery.

FIG. 7 is a table showing the compositions and firing conditions of solid electrolytes, etc. according to Examples and Comparative Examples.

FIG. 9 is a table showing evaluation results of lithium ion conductivities, crystal systems, and impurities according to Examples and Comparative Examples.

FIG. 12 is a table showing the charge and discharge conditions and the evaluation results of the lithium batteries of Examples and Comparative Examples.

DESCRIPTION OF EXEMPLARY EMBODIMENTS

Hereinafter, embodiments of the invention will be described with reference to the drawings. Incidentally, in the following respective drawings, in order to make respective layers and respective members have a recognizable size, the dimensions of the respective layers and the respective members are made different from the actual ones.

First Embodiment

Battery

Figure 1:
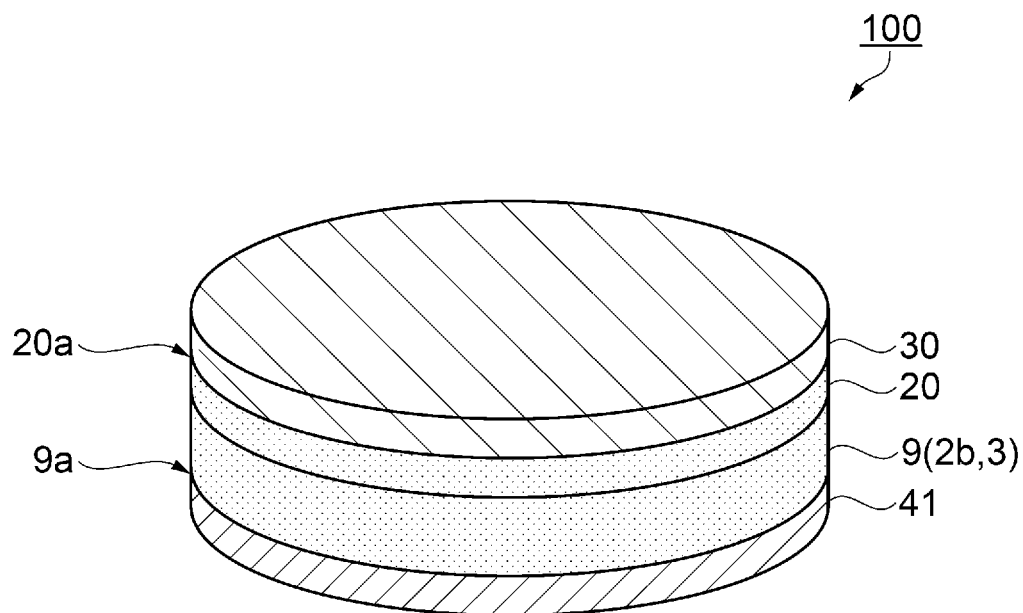
FIG. 1 is a schematic perspective view showing a structure of a lithium battery as a battery according to a first embodiment.

First, a battery according to this embodiment will be described with reference to FIG. 1. In this embodiment, a lithium battery will be described as an example of the battery. FIG. 1 is a schematic perspective view showing a structure of a lithium battery as the battery according to the first embodiment.

As shown in FIG. 1, a lithium battery 100 according to this embodiment includes a positive electrode 9 as a composite body including an electrolyte 3 and an active material 2b, a negative electrode 30 as an electrode provided on one side of the positive electrode 9 through an electrolyte layer 20, and a first current collector 41 as a current collector provided in contact with the other side of the positive electrode 9.

That is, the lithium battery 100 is a stacked body in which the first current collector 41, the positive electrode 9, the electrolyte layer 20, and the negative electrode 30 are sequentially stacked. In the electrolyte layer 20, a face which is in contact with the negative electrode 30 is defined as "one face 20a", and in the positive electrode 9, a face which is in contact with the first current collector 41 is defined as "surface 9a". For the electrolyte layer 20, a second current collector (not shown) may be provided as appropriate through the negative electrode 30, and the lithium battery 100 only needs to have a current collector which is in contact with at least one of the positive electrode 9 and the negative electrode 30.

Current Collector

For the first current collector 41 and the second current collector, any material can be suitably used as long as it is a forming material which does not cause an electrochemical reaction with the positive electrode 9 and the negative electrode 30, and has an electron conduction property. Examples of the forming material of the first current collector 41 and the second current collector include one type of metal (metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), alloys containing one or more types of metal elements selected from the above-mentioned group, electrically conductive metal oxides such as ITO (Tin-doped Indium Oxide), ATO (Antimony-doped Tin Oxide), and FTO (Fluorine-doped Tin Oxide), and metal nitrides such as titanium nitride (TiN), zirconium nitride (ZrN), and tantalum nitride (TaN).

As the form of the first current collector 41 and the second current collector, other than a thin film of the above-mentioned forming material having an electron conduction property, an appropriate form such as a metal foil, a plate shape, a mesh-like shape, a lattice-like shape, or a paste obtained by kneading an electrically conductive fine powder together with a binder can be selected according to the intended purpose. The thickness of such a first current collector 41 and a second current collector is not particularly limited, but is, for example, about 20 μm. The formation of the first current collector 41 and the second current collector may be performed after forming the positive electrode 9, the negative electrode 30, and the like, or may be performed before forming such members.

Negative Electrode

Examples of a negative electrode active material (forming material) contained in the negative electrode 30 include niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), ITO (Tin-doped Indium Oxide), ATO (Antimony-doped Tin Oxide), FTO (Fluorine-doped Tin Oxide), aluminum (Al)-doped zinc oxide (AZO), gallium (Ga)-doped zinc oxide (GZO), the anatase phase of $TiO_2$, lithium composite oxides such as $Li_4Ti_5O_{12}$ and $Li_2Ti_3O_7$, metals and alloys such as lithium (Li), silicon (Si), tin (Sn), a silicon-manganese alloy (Si—Mn), a silicon-cobalt alloy (Si—Co), a silicon-nickel alloy (Si—Ni), indium (In), and gold (Au), a carbon material, and a material obtained by intercalation of lithium ions between layers of a carbon material.

The thickness of the negative electrode 30 is preferably from approximately about 50 nm to 100 μm, but can be arbitrarily designed according to a desired battery capacity or material properties.

The lithium battery 100 has, for example, a circular disk shape, and the size of the outer shape thereof is such that the diameter is about 10 mm and the thickness is about 150 μm. In addition to being small and thin, the lithium battery 100 can be charged and discharged, and is capable of obtaining a large output energy, and therefore can be suitably used as a power supply source (power supply) for a portable information terminal or the like. The shape of the lithium battery 100 is not limited to a circular disk shape, and may be, for example, a polygonal disk shape. Such a thin lithium battery 100 may be used alone or a plurality of lithium batteries 100 may be stacked and used. In the case of stacking the lithium batteries 100, in the lithium battery 100, the first current collector 41 and the second current collector are not necessarily essential components, and a configuration in which one of the current collectors is included may be adopted.

Figure 2:
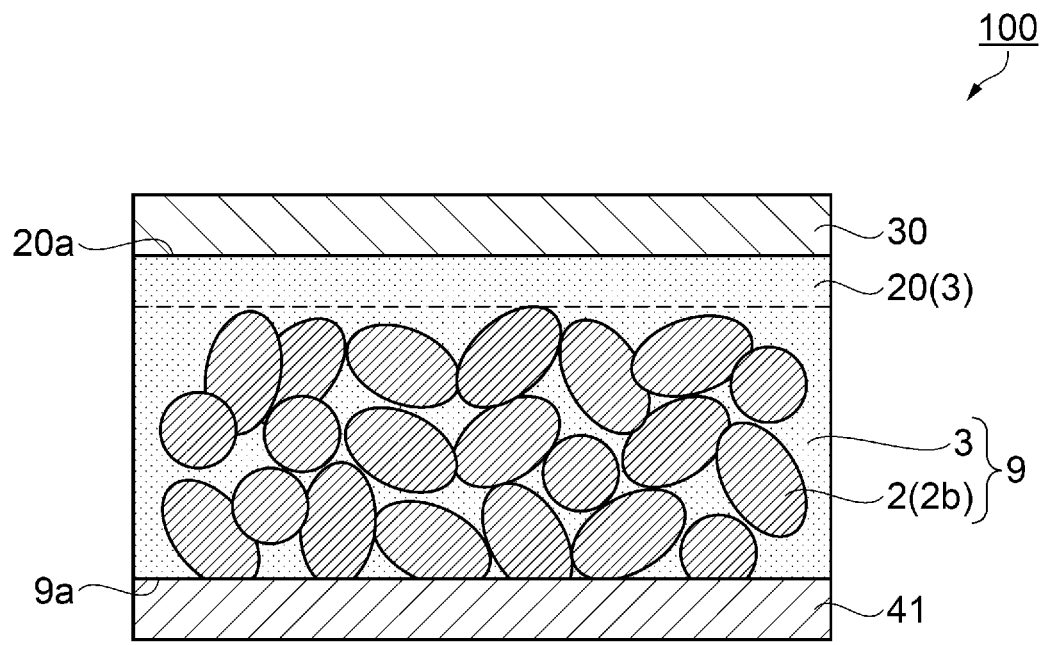
FIG. 2 is a schematic cross-sectional view showing a structure of the lithium battery.

Next, the structures of the positive electrode 9, the electrolyte layer 20, and the like included in the lithium battery 100 will be described with reference to FIG. 2. FIG. 2 is a schematic cross-sectional view showing the structure of the lithium battery.

As shown in FIG. 2, the electrolyte layer 20 includes the electrolyte 3, and the positive electrode 9 includes the active material 2b and the electrolyte 3. The active material 2b is in the form of particles, and a plurality of particles of the active material 2b gather to form an active material portion 2 having a plurality of pores among the active material 2b in the form of particles.

Positive Electrode

The plurality of pores of the active material portion 2 in the positive electrode 9 communicate with one another like a mesh inside the active material portion 2. Further, by the contact between the active materials 2b, an electron conduction property of the active material portion 2 is ensured. The electrolyte 3 is provided so as to fill up the plurality of pores of the active material portion 2 and further cover the entire active material portion 2. That is, the active material portion 2 and the electrolyte 3 are combined to form a positive electrode 9 (composite body). Therefore, as compared with the case where the active material portion 2 does not have a plurality of pores or the case where the electrolyte 3 is not provided inside the pores, the contact area between the active material 2b and the electrolyte 3 becomes large. Due to this, the interfacial resistance is decreased, and it becomes possible to achieve favorable charge transfer at the interface between the active material portion 2 and the electrolyte 3.

As in the lithium battery 100 of this embodiment, in the case where the first current collector 41 is used on the positive electrode 9 side, a lithium composite metal compound which is a positive electrode active material containing lithium (Li) is used as the active material 2b (active material portion 2). FIG. 2 is a view schematically showing the active material 2b, and the particle diameter and size of each active material 2b are not necessarily the same as the actual ones.

The lithium composite metal compound to be used as the positive electrode active material refers to a compound such as an oxide, which contains lithium and also contains two or more types of metal elements as a whole, and in which the existence of oxoacid ions is not observed.

Examples of the lithium composite metal compound include composite metal compounds containing lithium (Li) and also containing one or more types of elements selected from vanadium (V), chromium (Cr), manganese (Mn), iron (Fe), cobalt (Co), nickel (Ni), and copper (Cu). Such a composite metal compound is not particularly limited, however, specific examples thereof include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, $Li_2MnSiO_4$, $NMC(Li_a(Ni_xMn_yCo_{1-x-y})O_2)$, and $NCA(Li(Ni_xCo_yAl_{1-x-y})O_2)$. Further, in this embodiment, solid solutions obtained by substituting some of the atoms in a crystal of any of these lithium composite metal compounds with another transition metal, typical metal, alkali metal, alkaline rare earth metal, lanthanoid, chalcogenide, halogen, or the like are also included in the lithium composite metal compound, and any of these solid solutions can also be used as the positive electrode active material.

By using the lithium composite metal compound as the active material 2b in the forming material of the active material portion 2, electron transfer is performed between the particles of the active material 2b, and lithium ion transfer is performed between the active material 2b and the electrolyte 3. According to this, the function as the active material portion 2 can be favorably exhibited.

The active material portion 2 has a bulk density of preferably 50% or more and 90% or less, more preferably 50% or more and 70% or less. When the active material portion 2 has such a bulk density, the surface area of the inside of the pore of the active material portion 2 is enlarged, and the contact area between the active material portion 2 and the electrolyte 3 is easily increased. According to this, in the lithium battery 100, it becomes easier to increase the capacity than in the related art.

When the above-mentioned bulk density is denoted by β (%), the apparent volume including the pores of the active material portion 2 is denoted by v, the mass of the active material portion 2 is denoted by w, and the density of the particles of the active material 2b is denoted by ρ, the following mathematical formula (a) is established. According to this, the bulk density can be determined.

$$\beta = \{w/(v \cdot \rho)\} \times 100 \qquad (a)$$

In order to control the bulk density of the active material portion 2 to fall within the above range, the average particle diameter (median diameter) of the active material 2b is preferably set to 0.3 μm or more and 10 μm or less, and is more preferably 0.5 μm or more and 5 μm or less. The average particle diameter of the active material 2b can be measured by, for example, dispersing the active material 2b in n-octyl alcohol at a concentration within a range of 0.1 mass % or more and 10 mass % or less, and determining the median diameter using a light scattering particle size distribution analyzer, Nanotrac (trademark) UPA-EX250 (product name, MicrotracBEL Corporation).

The bulk density of the active material portion 2 may also be controlled by using a pore forming material in the step of forming the active material portion 2.

The resistivity of the active material portion 2 is preferably 700 Ω·cm or less. When the active material portion 2 has such a resistivity, a sufficient output can be obtained in the lithium battery 100. The resistivity can be determined by adhering a copper foil as an electrode to the surface of the active material portion 2, and performing DC polarization measurement.

In the active material portion 2, the plurality of pores communicate with one another like a mesh inside, and also the active material portions 2 are connected to one another to form a mesh-like structure. For example, LiCoO$_2$, which is a positive electrode active material, is known to have anisotropy in the electron conduction property in a crystal. Due to this, in a structure in which pores extend in a specific direction such that the pores are formed by machining, the electron conduction property may be decreased depending on the direction of the electron conduction property in a crystal. On the other hand, in this embodiment, the active material portion 2 has a mesh-like structure, and therefore, an electrochemically active continuous surface can be formed regardless of the anisotropy in the electron conduction property or ion conduction property in a crystal. Due to this, a favorable electron conduction property can be ensured regardless of the type of the forming material to be used.

The surface of the active material 2b constituting the active material portion 2 of the embodiment may be coated with barium titanate (BaTiO$_3$) or lithium niobate (LiNbO$_3$). By coating the surface with barium titanate or lithium niobate, the interfacial resistance in the active material 2b (active material portion 2) can be decreased.

Figure 3A:
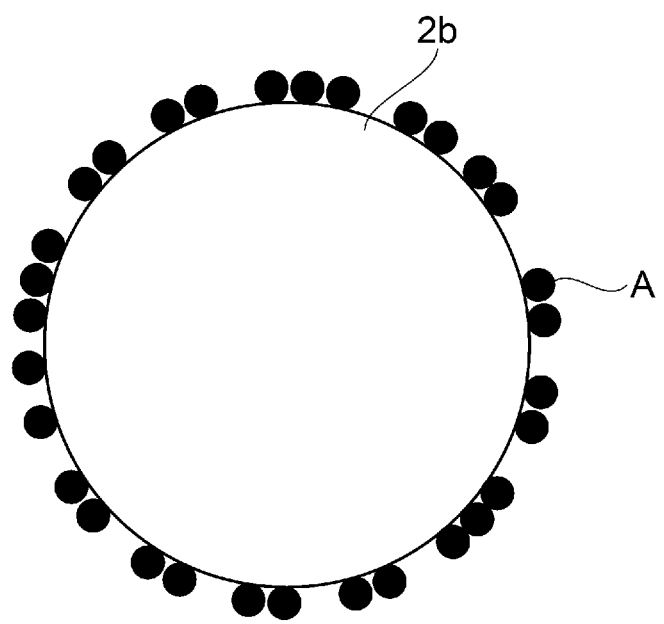
FIG. 3A is a schematic view showing a form of a coating on an active material particle with $BaTiO_3$.
Figure 3B:
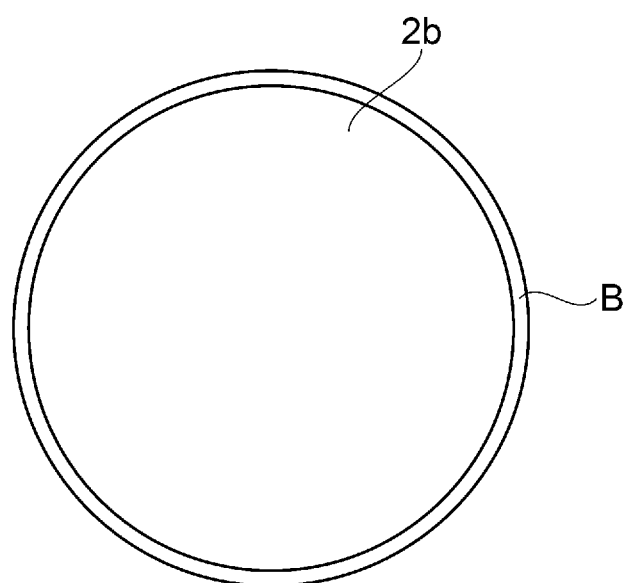
FIG. 3B is a schematic view showing a form of a coating on an active material particle with $LiNbO_3$.

Here, a form of a coating on the active material 2b (active material portion 2) will be described with reference to FIGS. 3A and 3B. FIG. 3A is a schematic view showing a form of a coating on an active material particle with BaTiO$_3$. FIG. 3B is a schematic view showing a form of a coating on an active material particle with LiNbO$_3$. FIGS. 3A and 3B are views each schematically showing a single particle of the active material 2b and a form of a coating, and the particle diameter and the thickness and the like of the coating are not necessarily the same as the actual ones.

As shown in FIG. 3A, in the case of BaTiO$_3$, particles A of BaTiO$_3$ which are finer than the particle of the active material 2b are attached and the surface of the active material 2b is coated with the particles A. The coating with the particles A of BaTiO$_3$ is preferably 50% or more of the entire surface area of the active material 2b. Further, the average particle diameter (median diameter) of the particles A is preferably 20 nm or more and 70 nm or less. According to this, polarization occurs on the surface of the active material 2b by BaTiO$_3$ which is a ferroelectric substance, so that the lithium ion density is increased to decrease the interfacial resistance. The average particle diameter of the particles A can be measured in the same manner as the active material 2b.

As shown in FIG. 3B, in the case of LiNbO$_3$, a coating film B of LiNbO$_3$ is formed on the surface of the active material 2b. The thickness of the coating film B of LiNbO$_3$ is preferably 1 nm or more and 30 nm or less, more preferably 3 nm or more and 20 nm or less. When the thickness of the coating film B is 1 nm or more, diffusion of an element contained in the active material 2b into the electrolyte 3 is suppressed to decrease the interfacial resistance. Here, the element contained in the active material 2b varies depending on the lithium composite metal compound to be used, but is cobalt (Co) in the case of LiCoO$_2$. When the thickness of the coating film B is 30 nm or less, the deterioration in the lithium ion conduction property can be suppressed.

The form of the coating with the particles A or the coating film B on the active material 2b (active material portion 2) is not limited to the above-mentioned forms, and a form in which a coating film in the form of an island is attached, or the like may be adopted.

Going back to FIG. 2, in the positive electrode 9, the contained amount of the binder (binding agent) for binding the active materials 2b or the pore forming material for adjusting the bulk density of the active material portion 2 is preferably reduced as much as possible. When the binder or the pore forming material remains in the active material portion 2 (positive electrode 9), such a component may sometimes adversely affect the electrical characteristics, and therefore, it is necessary to remove the component by carefully performing heating in a post-process. Specifically, in this embodiment, the mass loss percentage in the case where the positive electrode 9 is heated at 400° C. for 30 minutes is set to 5 mass % or less. The mass loss percentage is preferably 3 mass % or less, more preferably 1 mass % or less, and further more preferably, the mass loss is not observed or is within the measurement error range. When the mass loss percentage of the positive electrode 9 is within such a range, the amount of a solvent or adsorbed water which is evaporated, an organic substance which is vaporized by combustion or oxidation under a predetermined heating condition, or the like is reduced. According to this, the electrical characteristics (charge-discharge characteristics) of the lithium battery 100 can be further improved.

The mass loss percentage of the positive electrode 9 can be determined from the values of the mass of the positive electrode 9 before and after heating under a predetermined heating condition using a thermal gravimetric-differential thermal analyzer (TG-DTA).

In the lithium battery 100, a direction away from the first current collector 41 in the normal direction (the upper side of FIG. 2) is defined as "upward direction", the surface on the upper side of the positive electrode 9 is in contact with the electrolyte layer 20. The surface 9a on the lower side of the positive electrode 9 is in contact with the first current collector 41. In the positive electrode 9, the upper side in contact with the electrolyte layer 20 is "one side", and the lower side in contact with the first current collector 41 is "the other side".

On the surface 9a of the positive electrode 9, the active material portion 2 is exposed. Therefore, the active material portion 2 and the first current collector 41 are provided in contact with each other and both are electrically connected to each other. The electrolyte 3 is also provided inside the pores of the active material portion 2 and is in contact with the surface of the active material portion 2 including the inside of the pores of the active material portion 2 other than the face in contact with the first current collector 41. In the positive electrode 9 having such a configuration, due to the contact area between the first current collector 41 and the active material portion 2, the contact area between the active material portion 2 and the electrolyte 3 is increased. Due of this, the interface between the active material portion 2 and the electrolyte 3 hardly becomes a bottleneck of charge transfer, and therefore, favorable charge transfer is easily ensured as the positive electrode 9, and thus, it is possible to achieve high capacity and high output in the lithium battery 100 using the positive electrode 9.

Electrolyte

Figure 4:
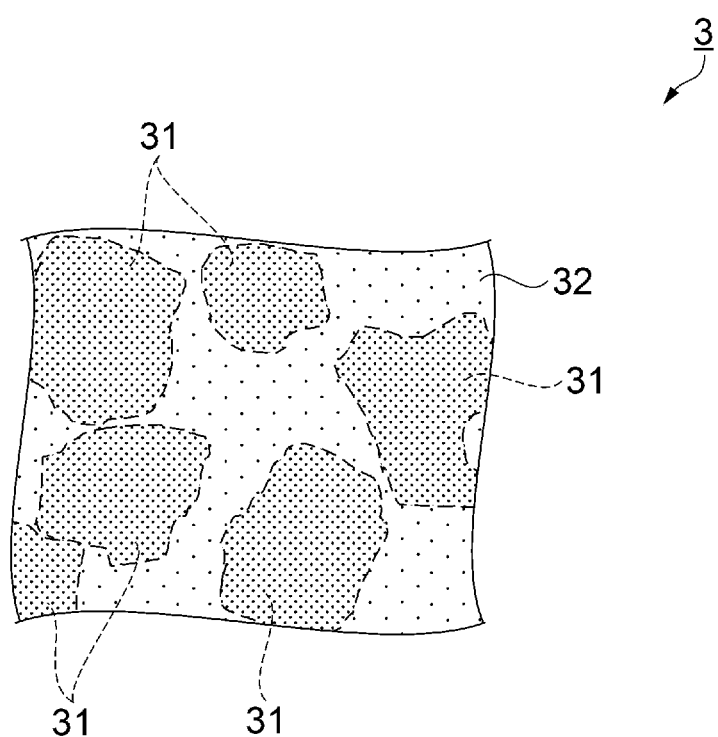
FIG. 4 is a schematic view showing a structure of an electrolyte.

Next, the structure of the electrolyte 3 included in the positive electrode 9 will be described with reference to FIG. 4. FIG. 4 is a schematic view showing the structure of the electrolyte.

The electrolyte 3 includes a crystalline first electrolyte portion 31 which contains a lithium composite metal oxide represented by the following compositional formula (1), and an amorphous second electrolyte portion 32 which contains lithium (Li), boron (B), and oxygen (O) and is in contact with the first electrolyte portion 31.

$(Li_{7-3x}Ga_x)(La_{3-y}Nd_y)Zr_2O_{12}$     (1)

In the formula (1), x and y satisfy the following formulae: $0.1 \le x \le 1.0$ and $0.01 \le y \le 0.2$.

In the first electrolyte portion 31, lithium (Li) is partially substituted with gallium (Ga) and lanthanum (La) is partially substituted with neodymium (Nd) as shown in the compositional formula (1). Therefore, as compared with the case where lanthanum (La) is not partially substituted with neodymium (Nd), the tetragonal-cubic phase transition temperature (phase transition temperature) of the first electrolyte portion 31 is lowered, so that the crystal after transition to the cubic phase easily grows at a lower temperature. The phase transition from the tetragonal phase to the cubic phase is generally secondary transition accompanied by a small heat absorption and is caused by temperature and heat quantity required for the phase transition. Further, by Raman scattering analysis or evaluation of lithium ion conduction property, it has already been known that in a tetragonal crystal, the movement of lithium is restricted, however, in a cubic crystal, lithium easily moves and the lithium ion conduction property is improved.

As shown in FIG. 4, the electrolyte 3 includes the first electrolyte portion 31 and the second electrolyte portion 32, and the second electrolyte portion 32 communicates with itself inside the electrolyte 3. The structure of such an electrolyte 3 can be confirmed by, for example, a transmission electron microscope (TEM) or the like.

FIG. 4 is a view schematically illustrating a state by observation of the structure using a transmission electron microscope with respect to the structure of such an electrolyte 3, and does not necessarily coincide with the actual state.

Here, in the battery according to the invention, the second electrolyte portion 32 is not necessarily essential. That is, the electrolyte 3 may be formed from the first electrolyte portion 31 without using the second electrolyte portion 32.

In the first electrolyte portion 31, x in the above compositional formula (1) is 0.1 or more, and therefore, the bulk lithium ion conductivity (grain bulk conductivity) in the electrolyte 3 can be improved. Since x in the above compositional formula (1) is 1.0 or less, the occurrence of coarse particles in the first electrolyte portion 31 can be suppressed.

As a forming material of the second electrolyte portion 32, a solid electrolyte having a lower melting point than the melting point of the active material 2b and the first electrolyte portion 31 may be used. Specific examples thereof include oxides, halides, hydrides, and borides such as $LiBH_4$ (268° C.), LiF (848° C.), LiCl (605° C.), LiBr (552° C.), LiI (469° C.), $Li_3BO_3$ (817° C.), and $Li_{2+x}C_{1-x}B_xO_3$ (0.01<x<0.5) (680° C. to 750° C.), and amorphous and partially crystallized glasses of partially substituted materials thereof. The temperature in parentheses after each compound name described above is the melting point of the compound. Among these, it is preferred to use a solid electrolyte containing lithium (Li), boron (B), and oxygen (O), and it is more preferred to use a solid electrolyte containing lithium (Li), boron (B), carbon (C), and oxygen (O). According to this, the amorphous second electrolyte portion 32 is easily formed, and the lithium ion conduction property of the electrolyte 3 can be further improved.

Further, a solid solution obtained by substituting some of the atoms of any of the above-mentioned compounds with another transition metal, typical metal, alkali metal, alkaline rare earth metal, lanthanoid, chalcogenide, halogen, or the like may also be used as the forming material of the second electrolyte portion 32. Among the above-mentioned solid electrolytes, one type may be used alone or two or more types may be used in admixture.

In this embodiment, as the forming material of the second electrolyte portion 32, $Li_{2+x}C_{1-x}B_xO_3$ (0.01<x<0.5) is used. Specific examples thereof include $Li_{22}C_{0.8}B_{0.2}O_3$. By using the above-mentioned forming material in the second electrolyte portion 32, the occurrence of dendrites due to segregation of lithium is suppressed, and a positive electrode 9 (composite body) having a dense structure is formed. According to this, the lithium ion conduction property in the positive electrode 9 can be further improved.

The total ion conductivity as the index of the lithium ion conduction property of the electrolyte 3 is set to $1.0\times10^{-4}$ S/cm or more. When the electrolyte 3 has such an ion conductivity, an ion contained in the electrolyte 3 at a position away from the surface of the active material portion 2 easily reaches the surface of the active material portion 2. Due to this, also the ion can contribute to the battery reaction in the active material portion 2, and the capacity of the lithium battery 100 can be further increased.

Here, the ion conductivity of the electrolyte 3 refers to a grain bulk conductivity as the conductivity of the electrolyte 3 itself, and in the case where the electrolyte 3 is a crystalline material, a grain boundary conductivity as the conductivity between crystal grains, and a total ion conductivity which is the sum of these conductivities. Further, the index of the grain boundary resistance in the electrolyte 3 is a grain boundary conductivity, and when the grain boundary conductivity increases, the grain boundary resistance decreases. The measurement method for the ion conductivity of the electrolyte 3 will be described later.

Electrolyte Layer

Going back to FIG. 2, the electrolyte layer 20 is provided between the positive electrode 9 and the negative electrode 30 as described above. The electrolyte layer 20 includes the same electrolyte 3 as that of the positive electrode 9, but does not include the active material 2b. By interposing the electrolyte layer 20 which does not include the active material 2b between the positive electrode 9 and the negative electrode 30, the positive electrode 9 and the negative electrode 30 are hardly electrically connected to each other, and the occurrence of a short circuit is suppressed. The positive electrode 9 and the electrolyte layer 20 each include the electrolyte 3, and therefore, the electrolytes 3 of the positive electrode 9 and the electrolyte layer 20 may be formed simultaneously at the time of production. That is, in the production step of the lithium battery 100, the formation of the active material portion 2 and the formation of the electrolyte layer 20 may be performed at a time. Further, the electrolyte layer 20 may be formed using a different forming material from that of the electrolyte 3. In such a case, the positive electrode 9 and the electrolyte layer 20 are formed in separate production steps.

The thickness of the electrolyte layer 20 is preferably 0.1 μm or more and 100 μm or less, more preferably 0.2 μm or more and 10 μm or less. By setting the thickness of the electrolyte layer 20 within the above range, the internal resistance of the electrolyte layer 20 is decreased, and the occurrence of a short circuit between the positive electrode 9 and the negative electrode 30 can be suppressed.

On the one face 20a (the face in contact with the negative electrode 30) of the electrolyte layer 20, a relief structure such as a trench, a grating, or a pillar may be provided by combining various molding methods and processing methods as needed.

Method for Producing Battery

A method for producing the lithium battery 100 as the battery according to this embodiment will be described with reference to FIGS. 5, 6A, 6B, 6C, 6D, and 6E. FIG. 5 is a process flowchart showing the method for producing the lithium battery. FIGS. 6A to 6E are schematic views each showing the method for producing the lithium battery. The process flow shown in FIG. 5 is an example, and the method is not limited thereto.

As shown in FIG. 5, the method for producing the lithium battery 100 according to this embodiment includes the following steps. In a step S1, a mixture is prepared by dissolving a plurality of types of raw materials containing elements constituting a lithium composite metal oxide represented by the following compositional formula (1) in a solvent, followed by mixing. In a step S2, an active material portion 2 as a first molded body is formed using an active material 2b. In a step S3, a second molded body which includes the active material portion 2 and a crystalline first electrolyte portion 31 obtained after a reaction by subjecting the mixture to a heating treatment in a state of being impregnated into the active material portion 2 to cause a reaction. In a step S4, the second molded body is filled with the melt of a second electrolyte 32a containing lithium (Li), boron (B), and oxygen (O) by melting the second electrolyte 32a by heating in a state where the second electrolyte 32a is brought into contact with the second molded body. In a step S5, a positive electrode 9 which includes the first electrolyte portion 31, a second electrolyte portion 32, and the active material 2b (active material portion 2) is formed by cooling the second molded body filled with the melt of the second electrolyte 32a. In a step S6, a negative electrode is formed on one side of the positive electrode through an electrolyte layer 20. In a step S7, a first current collector 41 is formed on the other side (a surface 9a) of the positive electrode 9.

$$(Li_{7-3x}Ga_x)(La_{3-y}Nd_y)Zr_2O_{12} \qquad (1)$$

In the formula (1), x and y satisfy the following formulae: $0.1 \leq x \leq 1.0$ and $0.01 \leq y \leq 0.2$.

The step S2 may include a step of applying a coating of $BaTiO_3$ or $LiNbO_3$ to the active material 2b (active material portion 2).

Here, the method for producing the lithium battery 100 includes a method for producing the electrolyte 3 of this embodiment. That is, the method for producing the electrolyte 3 of this embodiment includes a step of preparing a mixture by mixing a plurality of types of raw materials containing elements constituting a lithium composite metal oxide represented by the above compositional formula (1), a step of forming a crystalline first electrolyte portion 31 by subjecting the mixture to a heating treatment, a step of melting a second electrolyte 32a containing lithium (Li), boron (B), and oxygen (O) by heating in a state where the second electrolyte 32a is brought into contact with the first electrolyte portion 31, and a step of forming a second electrolyte portion 32 which is in contact with the first electrolyte portion 31 by cooling the melt of the second electrolyte 32a.

In the electrolyte 3, the second electrolyte portion 32 may not be provided. In such a case, the positive electrode 9 which includes the first electrolyte portion 31 and the active material portion 2 is formed by repeatedly performing the step of forming the crystalline first electrolyte portion 31 by subjecting the mixture to a heating treatment.

These steps included in the method for producing the electrolyte 3 are included in the step S1, the step S3, the step S4, and the step S5 in the method for producing the lithium battery 100 described above. In this embodiment, a method for producing the first electrolyte portion 31 using a liquid phase method is described as an example, but the method is not limited thereto. For example, the second molded body may be formed using a solid phase method by preparing a forming material of the first electrolyte portion 31 in the form of particles from the mixture, followed by mixing the active material 2b in the form of particles and then compression molding the resulting material.

Preparation of Mixture

In the step S1, a mixture is prepared by dissolving each of the precursors as the raw materials of the first electrolyte portion 31 in a solvent to form solutions, followed by mixing these solutions. That is, the mixture contains a solvent for dissolving the above-mentioned raw materials (precursors). As the precursors of the first electrolyte portion 31, metal compounds containing the elements constituting the lithium composite metal oxide represented by the above compositional formula (1) are used.

As the metal compounds containing the elements constituting the lithium composite metal oxide represented by the above compositional formula (1), a lithium compound, a gallium compound, a lanthanum compound, a neodymium compound, and a zirconium compound are used. The types of these compounds are not particularly limited, but each compound is preferably one or more types of metal salts or metal alkoxides of lithium, gallium, lanthanum, neodymium, or zirconium.

Examples of the lithium compound include lithium metal salts such as lithium chloride, lithium nitrate, lithium acetate, lithium hydroxide, and lithium carbonate, and lithium alkoxides such as lithium methoxide, lithium ethoxide, lithium propoxide, lithium isopropoxide, lithium n-butoxide, lithium isobutoxide, lithium sec-butoxide, lithium tert-butoxide, and lithium dipivaloylmethanate, and one or more types selected from this group can be adopted.

Examples of the gallium compound include gallium metal salts such as gallium bromide, gallium chloride, gallium iodide, and gallium nitrate, and gallium alkoxides such as gallium trimethoxide, gallium triethoxide, gallium tri-n-propoxide, gallium triisopropoxide, and gallium tri-n-butoxide, and one or more types selected from this group can be adopted.

Examples of the lanthanum compound include lanthanum metal salts such as lanthanum chloride, lanthanum nitrate, and lanthanum acetate, and lanthanum alkoxides such as lanthanum trimethoxide, lanthanum triethoxide, lanthanum tripropoxide, lanthanum triisopropoxide, lanthanum tri-n-butoxide, lanthanum triisobutoxide, lanthanum tri-sec-butoxide, lanthanum tri-tert-butoxide, and lanthanum tris(dipivaloylmethanate), and one or more types selected from this group can be adopted.

Examples of the neodymium compound include neodymium metal salts such as neodymium bromide, neodymium chloride, neodymium fluoride, neodymium oxalate, neodymium acetate, neodymium nitrate, neodymium sulfate, neodymium trimethacrylate, neodymium tris (acetylacetonate), and neodymium tri-2-ethylhexanoate, and neodymium alkoxides such as neodymium triisopropoxide and neodymium trimethoxyethoxide, and one or more types selected from this group can be adopted.

Examples of the zirconium compound include zirconium metal salts such as zirconium chloride, zirconium oxychloride, zirconium oxynitrate, zirconium oxyacetate, and zirconium acetate, and zirconium alkoxides such as zirconium tetramethoxide, zirconium tetraethoxide, zirconium tetrapropoxide, zirconium tetraisopropoxide, zirconium tetra-n-butoxide, zirconium tetraisobutoxide, zirconium tetra-sec-butoxide, zirconium tetra-tert-butoxide, and zirconium tetrakis(dipivaloylmethanate), and one or more types selected from this group can be adopted.

As the solvent contained in the solution which contains the precursors of the first electrolyte portion 31, a single solvent of water or an organic solvent or a mixed solvent capable of dissolving the above-mentioned metal salt or metal alkoxide is used. The organic solvent is not particularly limited, however, examples thereof include alcohols such as methyl alcohol, ethyl alcohol, n-propyl alcohol, isopropyl alcohol, n-butyl alcohol, allyl alcohol, and ethylene glycol monobutyl ether (2-butoxyethanol), glycols such as ethylene glycol, propylene glycol, butylene glycol, hexylene glycol, pentanediol, hexanediol, heptanediol, and dipropylene glycol, ketones such as dimethyl ketone, methyl ethyl ketone, methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether, organic acids such as formic acid, acetic acid, 2-ethylbutyric acid, and propionic acid, aromatics such as toluene, o-xylene, and p-xylene, and amides such as formamide, N,N-dimethylformamide, N,N-diethylformamide, dimethylacetamide, and N-methylpyrrolidone.

By dissolving each of the precursors of the first electrolyte portion 31 described above in any of the above-mentioned solvents, a plurality of solutions containing each of the precursors of the first electrolyte portion 31 (metal compound solutions) are prepared. Subsequently, a mixture is prepared by mixing the plurality of solutions. At this time, lithium, gallium, lanthanum, neodymium, and zirconium are incorporated in the mixture at a predetermined ratio according to the composition of the first electrolyte portion 31. At this time, the mixture may be prepared by mixing all the precursors, and then dissolving the mixed precursors in a solvent without preparing the plurality of metal compound solutions containing each of the precursors.

Lithium in the composition is sometimes volatilized by heating in a post-process. Therefore, the lithium compound may be blended excessively in advance so that the content of the lithium compound in the mixture is increased by about 0.05 mol % to 30 mol % with respect to the desired composition according to the heating condition.

Figure 6A:
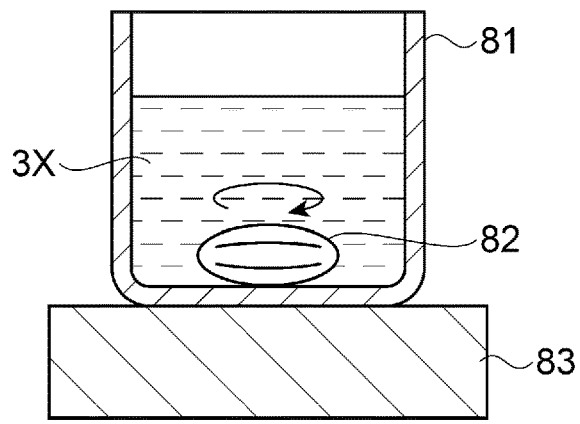
FIG. 6A is a schematic view showing the method for producing a lithium battery.

In the preparation of the mixture, specifically, for example, as shown in FIG. 6A, the plurality of solutions containing each of the precursors of the first electrolyte portion 31 are added to a beaker 81 made of Pyrex. A magnetic stirrer bar 82 is added thereto, and the solutions are mixed while stirring by a magnetic stirrer 83. By doing this, a mixture 3X is obtained. Then, the process proceeds to the step S2.

Formation of First Molded Body

In the step S2, the active material portion 2 as the first molded body is formed. In this embodiment, as a forming material (active material 2b) of the active material portion 2, $LiCoO_2$ which is a lithium composite metal compound is used. First, the particles of $LiCoO_2$ (Sigma-Aldrich Co., Ltd.) are subjected to a classification operation in n-butanol (butanol) using a wet-type centrifuge model LC-1000 (product name, Krettek Separation GmbH), whereby the active material 2b in the form of particles having an average particle diameter of about 5 μm is obtained.

Formation of Coating

In this embodiment, a coating of $BaTiO_3$ or $LiNbO_3$ may be applied to the particle of the active material 2b. As a method for forming the coating, a gas phase method such as a sputtering method or an ALD (Atomic Layer Deposition) method, a liquid phase method using a coating agent (liquid) containing forming materials of the coating, or a solid phase method is exemplified. In this embodiment, a method for forming a coating using a liquid phase method will be described as an example.

First, a coating agent (liquid) containing the forming materials of $BaTiO_3$ or $LiNbO_3$ is prepared. Specifically, each of the forming materials of $BaTiO_3$ or $LiNbO_3$ is dissolved in a solvent to prepare solutions, and the solutions are mixed, whereby the coating agent is prepared.

As the forming materials of $BaTiO_3$ or $LiNbO_3$, a barium compound, a titanium compound, a lithium compound, and a niobium compound are used. The types of these compounds are not particularly limited, but each is preferably one or more types of metal salts or metal alkoxides of barium, titanium, lithium, or niobium.

Examples of the barium compound include barium metal salts such as barium chloride, barium chloride dihydrate, barium bromide, barium bromide dihydrate, barium fluoride, barium iodide, barium iodide dihydrate, barium acetate, barium carbonate, barium oxalate, barium phosphate, barium nitrate, and barium sulfate, and barium alkoxides such as barium dimethoxide, barium diethoxide, barium dipropoxide, barium diisopropoxide, barium di-n-butoxide, barium diisobutoxide, barium di-sec-butoxide, barium di-tert-butoxide, and barium bis(dipivaloylmethanate), and one or more types selected from this group can be adopted.

Examples of the titanium compound include titanium metal salts such as titanium tetrabromide and titanium tetrachloride, and titanium alkoxides such as titanium tetramethoxide, titanium tetraethoxide, titanium tetraisopropoxide, titanium tetrapropoxide, titanium tetra-n-butoxide, titanium tetraisobutoxide, titanium tetra-sec-butoxide, and titanium tetra-tert-butoxide, and one or more types selected from this group can be adopted.

As the lithium compound, one or more types selected from the lithium compounds to be used as the metal compound containing the elements constituting the lithium composite metal oxide of the compositional formula (1) described above can be adopted.

Examples of the niobium compound include niobium metal salts such as niobium chloride, niobium oxychloride, niobium oxalate, niobium triacetylacetonate, and niobium pentaacetylacetonate, and niobium alkoxides such as niobium pentaethoxide, niobium pentapropoxide, niobium pentaisopropoxide, and niobium penta-sec-butoxide, and one or more types selected from this group can be adopted.

As the solvent contained in the solution which contains the forming materials of $BaTiO_3$ or $LiNbO_3$, a single solvent of water or an organic solvent or a mixed solvent capable of dissolving the above-mentioned metal salt or metal alkoxide is used. Specifically, the same solvent as used in the solution containing the precursors of the first electrolyte portion 31 can be adopted.

The coating agent may contain a surfactant. By adding a surfactant to the coating agent, the wettability of the coating agent on the active material 2b, the dispersibility when dispersing the active material 2b in the coating agent, or the like can be improved. Examples of the surfactant include a nonionic surfactant, an anionic surfactant, a cationic surfactant, and an amphoteric surfactant.

As the nonionic surfactant, an acetylene glycol compound, a fluorine compound, a polyoxyethylene compound, a silicone compound, or the like can be adopted and is appropriately selected according to the type of the solvent to be used or the like.

The acetylene glycol compound is not particularly limited, but examples thereof include Surfynol (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D, Dynol (registered trademark) 604 and 607 (all of the above are trade names, Air Products and Chemicals, Inc.), Olfine (registered trademark) B, Y, P, A, STG, SPC, E1004, E1010, E1020, PD-001, PD-002W, PD-003, PD-004, PD-005, EXP.4001, EXP.4036, EXP.4051, EXP.4123, EXP.4200, EXP.4300, AF-103, AF-104, AK-02, SK-14, and AE-3 (all of the above are trade names, Nissin Chemical Co., Ltd.), and Acetylenol (registered trademark) E00, E00P, E40, E60, and E100 (all of the above are trade names, Kawaken Fine Chemicals Co., Ltd.).

The fluorine compound is not particularly limited, but examples thereof include perfluoroalkyl sulfonate salts, perfluoroalkyl carboxylate salts, perfluoroalkyl phosphate esters, perfluoroalkyl ethylene oxide adducts, perfluoroalkyl betaines, perfluoroalkyl amine oxide compounds, and fluorine-modified polymers. Examples of commercially available products of these compounds include S-144 and S-145 (all of the above are trade names, Asahi Glass Co., Ltd.), FC-170C, FC-430, and Fluorad FC4430 (all of the above are trade names, Sumitomo 3M Limited), FSO, FSO-100, FSN, FSN-100, and FSN-300 (all of the above are trade names, DuPont, Inc.), FT-250 and FT-251 (all of the above are trade names, Neos Corporation), and BYK (registered trademark)-340 (trade name, BYK, Inc.).

The polyoxyethylene compound is not particularly limited, but examples thereof include Newcol (registered trademark) 2300 series (such as 2303, 2327, and 2399-S), Newcol NT series (such as 3, 5, 7, and 9), and Newcol 1000 series (such as 1004, 1006, 1008, 1203, 1305, and 1525) (all of the above are trade names, Nippon Nyukazai Co., Ltd.), Tween (registered trademark) 20 and 80 (all of the above are trade names, Tokyo Chemical Industry Co., Ltd.) Emulgen (registered trademark) 102KG, 103, 104P, 105, 106, 108, 120, 147, 150, 220, 350, 404, 420, 705, 707, 709, 1108, 4085, and 2025G (all of the above are trade names, Kao Corporation), Brij (registered trademark) 35 and 58 (trade names, ICI, Inc.), Triton (registered trademark) X-100 and X-114 (trade names, MP Biomedicals, Inc.), and polyoxyethylene alkyl ether compounds such as polyoxyethylene-polyoxypropylene hexyl ether ($C_6H_{13}$-EO-PO-OH).

The silicone compound is not particularly limited, but a polysiloxane-based compound can be used. As the polysiloxane-based compound, for example, polyether-modified organosiloxanes are exemplified. Examples of commercially available products of the polyether-modified organosiloxanes include BYK-306, BYK-307, BYK-333, BYK-341, BYK-345, BYK-346, BYK-347, BYK-348, and BYK-349 (all of the above are trade names, BYK, Inc.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of the above are trade names, Shin-Etsu Chemical Co., Ltd.), and Silface (registered trademark) SAG002, 005, 503A, and 008 (all of the above are trade names, manufactured by Nisshin Chemical Co., Ltd.).

Examples of the anionic surfactant include higher fatty acid salts, soaps, α-sulfo fatty acid methyl ester salts, alkyl benzene sulfonate salts, alkyl sulfate ester salts, alkyl ether sulfate ester salts, monoalkyl phosphate ester salts, α-olefin sulfonate salts, alkylnaphthalene sulfonate salts, naphthalene sulfonate salts, alkane sulfonate salts, polyoxyethylene alkyl ether sulfate salts, sulfosuccinate salts, and polyoxyalkylene glycol alkyl ether phosphate ester salts.

Examples of the cationic surfactant include quaternary ammonium salt compounds such as alkyl trimethyl ammonium salts, dialkyl dimethyl ammonium salts, and alkyl dimethyl benzyl ammonium salts, and amine salt compounds such as N-methylbishydroxyethylamine fatty acid ester hydrochloride salts.

The amphoteric surfactant is not particularly limited, but examples thereof include amino acid compounds such as alkylamino fatty acid salts.

Each of the above-mentioned forming materials of $BaTiO_3$ or $LiNbO_3$ is dissolved in any of the above-mentioned solvents, thereby preparing a plurality of solutions containing the forming materials of $BaTiO_3$ or $LiNbO_3$. Subsequently, the plurality of solutions are mixed, and then, any of the above-mentioned surfactants is added thereto, thereby preparing the coating agent. At this time, in the coating agent, barium, titanium, lithium, or niobium is incorporated at a predetermined ratio according to the composition of $BaTiO_3$ or $LiNbO_3$. At this time, the coating agent may be prepared by mixing all the forming materials, and then dissolving the mixture in a solvent without preparing the plurality of solutions containing each of the forming materials. In the preparation of the coating agent, the same method as in the preparation of the mixture (the mixture containing the raw materials of the first electrolyte portion 31) described above can be adopted.

Figure 6B:
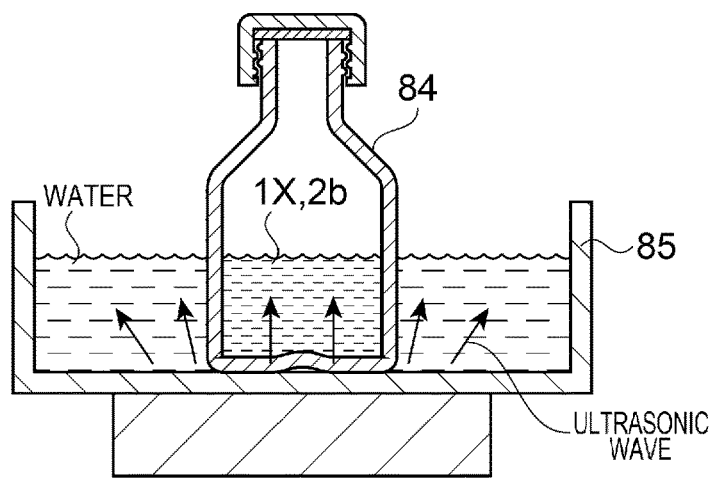
FIG. 6B is a schematic view showing the method for producing a lithium battery.

Subsequently, the active material 2b is added and mixed in the coating agent, thereby dispersing the particles of the active material 2b in the coating agent. Specifically, as shown in FIG. 6B, the coating agent 1X and the active material 2b are placed in a reagent bottle 84 made of Pyrex (trademark of Corning Incorporated). The reagent bottle 84 is dipped in an ultrasonic cleaner 85 containing water, and an ultrasonic wave is applied to the reagent bottle. By doing this, the active material 2b is dispersed in the coating agent 1X while suppressing the generation of secondary particles. Thereafter, the excessive coating agent 1X is removed using a centrifuge or the like, and the active material 2b with the coating agent 1X attached to the surface thereof is transferred to a titanium dish having an inner diameter of 50 mm and a depth of 20 mm and heated on a hot plate or the like. At this time, the solvent contained in the coating agent 1X is evaporated by heating at 100° C. or lower for about 30 minutes, and then, the organic components are burned and decomposed by heating at 360° C. for 30 minutes. Subsequently, heating is performed at 540° C. for 1 hour, thereby removing the remaining organic components and applying a coating of $BaTiO_3$ or $LiNbO_3$ to the surface of the active material 2b. In this manner, the active material 2b whose surface is coated with $BaTiO_3$ or $LiNbO_3$ is obtained.

In the above description, the coating of $BaTiO_3$ or $LiNbO_3$ is applied to the active material 2b in the form of particles, however, the invention is not limited thereto. The coating may be applied to the surface of the active material portion 2 (active material 2b) by applying the coating agent 1X to the active material portion 2 after forming the active material portion 2 using the active material 2b.

Figure 6C:
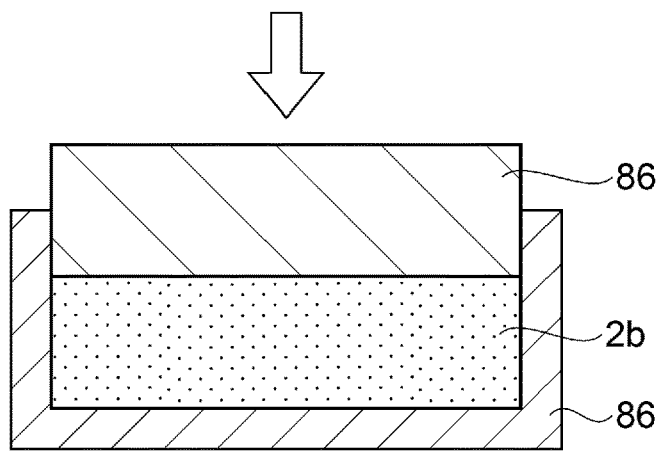
FIG. 6C is a schematic view showing the method for producing a lithium battery.

Subsequently, by using a molding die 86 as shown in FIG. 6C, the active material 2b or the active material 2b with a coated surface (hereinafter, also simply referred to as "active material 2b") is compression molded. Specifically, a powder of $LiCoO_2$ is pressed at a pressure of 624 MPa for 2 minutes using the molding die 86 (a die with an exhaust port having an inner diameter of 10 mm), whereby a disk-shaped molded material (diameter: 10 mm, effective diameter: 8 mm, thickness: 150 μm) of $LiCoO_2$ (active material 2b) is produced.

Thereafter, the molded material of the active material 2b is placed on a substrate and subjected to a heat treatment at 900° C. over 8 hours, whereby the active material portion 2 is obtained. By this heat treatment, the particles of the active material 2b are sintered to one another, and the shape of the molded material is easily retained. Further, the active materials 2b are brought into contact with each other and bound to each other, whereby an electron transfer pathway is formed. The forming material of the substrate is not particularly limited, however, it is preferred to use a material which hardly reacts with the active material 2b and the electrolyte 3, and for example, magnesium oxide or the like is exemplified.

The temperature of the heat treatment is preferably, for example, a temperature which is 850° C. or higher and is lower than the melting point of the active material 2b. According to this, the active materials 2b are sintered to one another, whereby the active material portion 2 which is an integrated porous material is obtained. By setting the temperature of the heat treatment to 850° C. or higher, sintering proceeds sufficiently, and also the electron conduction property in the crystal of the active material 2b is ensured. By setting the temperature of the heat treatment lower than the melting point of the active material 2b, excessive volatilization of lithium ions in the crystal of the active material 2b is suppressed, and the lithium ion conduction property is maintained. Due to this, it becomes possible to ensure the electrical capacity of the positive electrode 9. The temperature of the heat treatment is more preferably 875° C. or higher and 1000° C. or lower. According to this, in the lithium battery 100 using the positive electrode 9, appropriate output and capacity can be provided.

The time of the heat treatment is preferably set to, for example, 5 minutes or more and 36 hours or less, and is more preferably 4 hours or more and 14 hours or less. By the above-mentioned treatment, the active material portion 2 having a plurality of pores is obtained. Then, the process proceeds to the step S3.

Formation of Second Molded Body

In the step S3, the mixture 3X prepared in the step S1 is brought into contact with the active material portion 2 and impregnated into the active material portion 2, and then, a heating treatment is performed, whereby the crystalline first electrolyte portion 31 is produced from the mixture 3X. In this manner, the first electrolyte portion 31 is formed on the surface including the inside of the plurality of pores of the active material portion 2, whereby the second molded body is obtained.

Figure 6D:
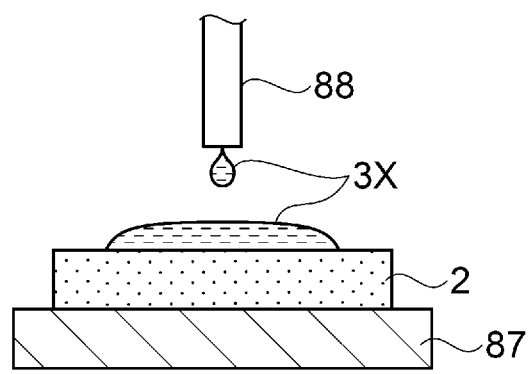
FIG. 6D is a schematic view showing the method for producing a lithium battery.

First, the mixture 3X and the active material portion 2 are brought into contact with each other and the mixture 3X is impregnated into the active material portion 2. Specifically, as shown in FIG. 6D, the active material portion 2 is placed on a substrate 87. The substrate 87 is made of, for example, magnesium oxide.

Subsequently, the mixture 3X is applied to the surface of the active material portion 2 including the inside of the pores of the active material portion 2 using a micropipette 88 or the like. At this time, the application amount of the mixture 3X is adjusted so that the bulk density of the produced second molded body is approximately about 75% or more and 85% or less. In other words, the application amount of the mixture 3X is adjusted so that about half the volume of the voids (pores) of the active material portion 2 is filled with the first electrolyte portion 31. The bulk density of the second molded body can be obtained in the same manner as the bulk density of the active material portion 2 described above.

As the method for applying the mixture 3X, other than dropping using the micropipette 88, for example, a method such as immersion, spraying, penetration by capillary phenomenon, or spin coating can be used, and these methods may be performed in combination. The mixture 3X has fluidity, and therefore also easily reaches the inside of the pores of the active material portion 2 by capillary phenomenon. The mixture 3X is applied so as to wet and spread on the entire surface including the inside of the pores of the active material portion 2.

In the case where the electrolyte layer 20 is formed from the same forming material as that of the electrolyte 3, the mixture may be excessively applied to one face of the active material portion 2. By performing the below-mentioned heating treatment in this state, the active material portion 2 is completely sunk in the first electrolyte portion 31, and the electrolyte layer 20 is formed.

Subsequently, the mixture 3X impregnated into the active material portion 2 is subjected to a heating treatment. The heating treatment includes a first heating treatment in which the heating temperature is 500° C. or higher and 650° C. or lower, and a second heating treatment which is performed after the first heating treatment, and in which the heating temperature is 800° C. or higher and 1000° C. or lower. By the first heating treatment, the solvent contained in the mixture 3X or an organic substance such as an impurity is decomposed and reduced. Therefore, in the second heating treatment, the purity is increased, so that the reaction is accelerated, and the first electrolyte portion 31 can be formed. Further, by setting the temperature of the heating treatment to 1000° C. or lower, the occurrence of a side reaction at the crystal grain boundary or volatilization of lithium can be suppressed. Accordingly, the lithium ion conduction property can be further improved. The heating treatment may be performed in a dry atmosphere, an oxidizing atmosphere, an inert gas atmosphere, or the like. As a method for the heating treatment, for example, the heating treatment is performed using an electric muffle furnace or the like.

Subsequently, the mixture is gradually cooled to room temperature after the heating treatment. The reaction in the mixture 3X proceeds by the heating treatment, whereby the crystalline first electrolyte portion 31 is formed.

Accordingly, the second molded body in which the active material portion 2 and the first electrolyte portion 31 are combined is obtained. The second molded body has a bulk density of approximately about 75% or more and 85% or less and has a plurality of pores. When the bulk density of the second molded body is less than 75%, the step S3 is performed repeatedly until the bulk density reaches 75% or more. In this embodiment, the first electrolyte portion 31 is formed using a liquid phase method, however, the method is not limited thereto. The first electrolyte portion 31 and the like may be formed using a solid phase method. Then, the process proceeds to the step S4.

Filling with Second Electrolyte

In the step S4, the melt of the second electrolyte 32a containing the forming materials of the second electrolyte portion 32 is filled in the pores of the second molded body. In this embodiment, as the second electrolyte 32a, $Li_{2.2}C_{0.8}B_{0.2}O_3$ (hereinafter also referred to as "LCBO") is used. First, the particles (powder) of LCBO are produced. Specifically, for example, $Li_2CO_3$ and $Li_3BO_3$ are mixed at a molar mixing ratio of 4:1, and the resulting mixture is pressed into a tablet at a pressure of 30 MPa for 2 minutes using the molding die 86 used in the step S2. Thereafter, the tablet is placed in a high-temperature furnace and fired at 650° C. for 4 hours, whereby a solid material of LCBO is produced. This solid material is ground using a dry mill or the like, whereby LCBO particles (particles of the second electrolyte 32a) as the powder form are obtained.

Here, the melting point of the produced LCBO particles was measured using a thermal gravimetric-differential thermal analyzer TG-DTA 2000SA (product name, Bruker AXS GmbH), and as a result, it was about 685° C. The measurement conditions for the melting point will be described in Examples. The method for producing the second electrolyte 32a in the form of particles is not limited to the above-mentioned method, and a known method can be adopted.

Figure 6E:
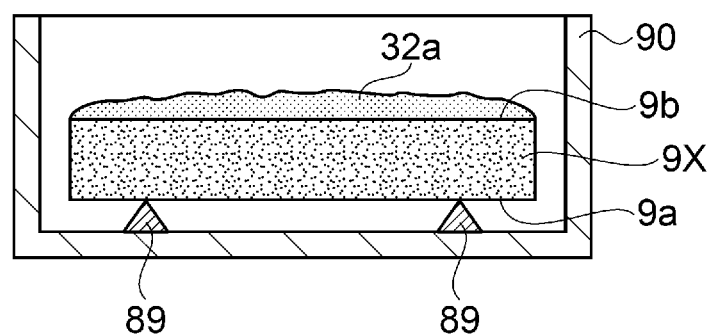
FIG. 6E is a schematic view showing the method for producing a lithium battery.

Subsequently, the melt of the second electrolyte 32a is impregnated into the second molded body. Specifically, as shown in FIG. 6E, the second molded body 9X is placed in a pot 90 through a support 89. Further, the second electrolyte 32a in the form of particles is placed on the upper face 9b (ceiling face) of the second molded body 9X.

The pot 90 is made of, for example, magnesium oxide, and the support 89 is made of, for example, gold (Au). In this embodiment, a face (lower face) opposed to the upper face 9b of the second molded body 9X is a surface 9a of the positive electrode 9 (see FIG. 1).

The mass of the second electrolyte 32a to be placed on the upper face 9b is preferably set not less than a mass sufficient for filling up the plurality of pores of the second molded body 9X. Further, the upper face 9b may be defined as a face under which the active material portion 2 is completely sunk in the first electrolyte portion 31. According to this, the electrolyte layer 20 can be formed simultaneously with the positive electrode 9 by adjusting the mass. In such a case, the upper face 9b becomes one face 20a of the electrolyte layer 20. In this embodiment, the positive electrode 9 and the electrolyte layer 20 are formed simultaneously.

In the above-mentioned state, the second electrolyte 32a in the form of particles alone or the whole including the second electrolyte 32a in the form of particles and the second molded body 9X is heated. The heating temperature at this time can be arbitrarily set as long as the heating temperature is higher than the melting point of the second electrolyte 32a and lower than the melting point of the first electrolyte portion 31. In this embodiment, the heating temperature is set to 700° C. Examples of a heating method include an electric muffle furnace and laser annealing. A molded pellet is produced from the second electrolyte 32a in the form of particles, and this molded pellet may be placed on the second molded body 9X and then heated.

The second electrolyte 32a is melted and transformed into a melt by being heated to a temperature above the melting point of the second electrolyte 32a. The melt covers the entire second molded body 9X while penetrating the inside of the pores from the upper face 9b of the second molded body 9X.

Here, the method for filling the second electrolyte 32a in the second molded body 9X is not limited to the above-mentioned method in which the melt of the second electrolyte 32a is penetrated. Examples of other forming methods include immersion, dropping, spraying, penetration by capillary phenomenon, and spin coating using a solution containing the precursors of the second electrolyte 32a, and by performing heating in a post-process, removal of the solvent in the solution and firing of the second electrolyte 32a may be performed. Then, the process proceeds to the step S5.

Formation of Positive Electrode

In the step S5, the melt of the second electrolyte 32a and the second molded body 9X are allowed to cool, whereby the melt of the second electrolyte 32a is solidified. At this time, the melt of the second electrolyte 32a is solidified in a state where the melt is in contact with the first electrolyte portion 31 provided on the surface of the active material portion 2 in the second molded body 9X. In this manner, the positive electrode 9 in which the active material portion 2, the first electrolyte portion 31, and the second electrolyte portion 32 are combined is formed.

The electrolyte 3 may be formed from the first electrolyte portion 31 without using the second electrolyte portion 32. That is, in such a case, the voids of the second molded body 9X are filled by repeatedly performing the step S3, whereby the positive electrode 9 (composite body) is formed. Then, the process proceeds to the step S6.

Formation of Negative Electrode

In the step S6, the negative electrode 30 is formed on one side of the positive electrode 9, that is, on one face 20a of the electrolyte layer 20. As a method for forming the negative electrode 30, other than a solution process such as a so-called sol-gel method or an organometallic thermal decomposition method involving a hydrolysis reaction or the like of an organometallic compound, a CVD (Chemical Vapor Deposition) method using an appropriate metal compound and an appropriate gas atmosphere, an ALD method, a green sheet method or a screen printing method using a slurry of solid electrolyte particles, an aerosol deposition method, a sputtering method using an appropriate target and an appropriate gas atmosphere, a PLD (Pulsed Laser Deposition) method, a vacuum deposition method, plating, thermal spraying, or the like can be used. As a forming material of the negative electrode 30, the above-mentioned negative electrode active material can be adopted, and in this embodiment, lithium (Li) metal is used. Then, the process proceeds to the step S7.

Formation of First Current Collector

In the step S7, first, the face (lower face) opposed to the face (one face 20a) on which the electrolyte layer 20 is formed of the positive electrode 9 is polished. At this time, by a polishing process, the active material portion 2 is reliably exposed to form the surface 9a. By doing this, electrical connection between the active material portion 2 and the first current collector 41 to be formed thereafter can be ensured. In the case where the active material portion 2 is sufficiently exposed on the lower face side of the positive electrode 9 in the above-mentioned step, this polishing process may be omitted.

Subsequently, the first current collector 41 is formed on the surface 9a. Examples of a method for forming the first current collector 41 include a method in which an appropriate adhesive layer is separately provided to adhere the first current collector 41, a gas phase deposition method such as a PVD (Physical Vapor Deposition) method, a CVD method, a PLD method, an ALD method, and an aerosol deposition method, and a wet method such as a sol-gel method, an organometallic thermal decomposition method, and plating, and an appropriate method can be used according to the reactivity with the face on which the first current collector 41 is formed, an electrical conduction property desired for the electrical circuit, and the design of the electrical circuit. Further, as a forming material of the first current collector 41, the above-mentioned forming material can be adopted. By undergoing the above-mentioned steps, the lithium battery 100 is produced.

As described above, by the electrolyte 3, the method for producing the electrolyte 3, the lithium battery 100, and the method for producing the lithium battery 100 according to the above-mentioned embodiment, the following effects can be obtained.

According to the electrolyte 3, even if firing is performed at 1000° C. or lower which is a relatively low temperature for the firing temperature, the grain boundary resistance of crystal grains can be decreased and also the lithium ion conduction property can be improved. Specifically, the first electrolyte portion 31 is a crystalline lithium composite metal oxide having the compositional formula (1) as a basic structure. That is, in the first electrolyte portion 31, lithium (Li) among the elements constituting the lithium composite metal oxide is partially substituted with gallium (Ga). Accordingly, in the electrolyte 3, the bulk lithium ion conductivity (grain bulk conductivity) can be improved.

When lithium is partially substituted with gallium, there is a tendency that coarse particles are likely to be generated. When many coarse particles are present, the contact area between the particles is decreased to decrease the lithium ion conduction property (total ion conductivity). Therefore, further, lanthanum (La) is partially substituted with neodymium (Nd). By doing this, the generation of coarse particles is suppressed, and the particle diameter can be decreased. By decreasing the particle diameter of the first electrolyte portion 31, the contact area between the particles is further increased when the first electrolyte portion 31 is compression molded to form the electrolyte 3. Further, the small particles of the first electrolyte portion 31 gather densely to form the electrolyte 3, and therefore, the grain boundary resistance can be decreased. Further, by partially substituting lanthanum with neodymium, the dielectric constant of the electrolyte 3 is increased, whereby the lithium ion conduction property can be further improved. That is, even if firing is performed at a low temperature of 1000° C. or lower, the electrolyte 3 in which the grain boundary resistance is decreased and the lithium ion conduction property is improved as compared with the related art can be provided.

Since the crystalline first electrolyte portion 31 represented by the compositional formula (1) is formed, the electrolyte 3 in which the grain boundary resistance is decreased and the lithium ion conduction property is improved can be produced. Since the first electrolyte portion 31 is formed by a liquid phase method, the crystal grain of the first electrolyte portion 31 is crystallized from the solution of the mixture, and therefore, as compared with a solid phase method, the micronization of the crystal grain is facilitated. Further, by the first heating treatment, the solvent contained in the mixture or an organic substance such as an impurity is decomposed and reduced. Therefore, in the second heating treatment, the purity is increased and the first electrolyte portion 31 can be formed. Further, by setting the temperature of the heating treatment to 1000° C. or lower, the occurrence of a side reaction at the crystal grain boundary or volatilization of lithium can be suppressed. Accordingly, the electrolyte 3 in which the lithium ion conduction property is further improved can be produced.

Since the amorphous second electrolyte portion 32 is formed, the crystalline first electrolyte portion 31 is joined to the second electrolyte portion 32, and therefore, the resistance occurring at the crystal interface of the first electrolyte portion 31 is further decreased. In addition, the lithium ion conduction property of the electrolyte 3 can be further improved.

Since LCBO is used for the second electrolyte portion 32, the amorphous second electrolyte portion 32 is easily formed, and therefore, the lithium ion conduction property of the electrolyte 3 can be still further improved.

By coating the surface with $BaTiO_3$ or $LiNbO_3$, the interfacial resistance in the active material 2b (active material portion 2) can be decreased.

Since the electrolyte 3 is formed by bringing the melt of LCBO into contact with the first electrolyte portion 31, the amorphous second electrolyte portion 32 is easily formed in contact with the first electrolyte portion 31, and therefore, the electrolyte 3 in which the lithium ion conduction property is still further improved can be produced.

Since the electrolyte 3 in which the grain boundary resistance is decreased and the lithium ion conduction property is improved is used, the lithium battery 100 having improved charge-discharge characteristics can be formed. Since the active material 2b (positive electrode active material) to serve as a lithium supply source is included, the charge-discharge characteristics of the lithium battery 100 can be further improved. Further, the capacity of the lithium battery 100 can be increased as compared with the related art.

The second molded body is produced by forming the first electrolyte portion 31 in the inside including the surface of the active material portion 2 which includes the active material 2b by a liquid phase method. Further, the positive electrode 9 is produced by filling the melt of the second electrolyte 32a in the inside including the surface of the second molded body. Therefore, the positive electrode 9 is formed such that the active material 2b and the first electrolyte portion 31 are in contact with each other, and the first electrolyte portion 31 and the second electrolyte portion 32 are in contact with each other. The positive electrode 9 having such a configuration can be easily produced, and also the lithium battery 100 in which the grain boundary resistance of the electrolyte 3 is decreased and the lithium ion conduction property is improved by the configuration can be produced.

By the first heating treatment, the solvent contained in the mixture or an organic substance such as an impurity is decomposed and reduced. Therefore, in the second heating treatment, the purity is increased and the first electrolyte portion 31 can be formed. Further, by setting the temperature of the heating treatment to 1000° C. or lower, the occurrence of a side reaction at the crystal grain boundary or volatilization of lithium can be suppressed. Accordingly, the lithium battery 100 in which the lithium ion conduction property is further improved can be produced.

Next, the effects of the above-mentioned embodiment will be more specifically described by showing Examples and Comparative Examples with respect to a solid electrolyte as the electrolyte according to the above-mentioned embodiment.

FIG. 7 is a table showing the compositions and firing conditions of solid electrolytes, etc. according to Examples and Comparative Examples. In the weight measurement in the following experiment, the weight was measured to the first decimal place using an analytical balance ME204T (Mettler Toledo International, Inc.).

EXAMPLES AND COMPARATIVE EXAMPLES

Preparation of Metal Compound Solutions

First, by using a lithium compound, a gallium compound, a lanthanum compound, a neodymium compound, a calcium compound, a zirconium compound, and a solvent, the following metal compound solutions were prepared as metal element sources containing the metal compounds, respectively.

2-Butoxyethanol Solution of 1 mol/kg Lithium Nitrate

In a 30-g reagent bottle made of Pyrex (trademark of Corning Incorporated) equipped with a magnetic stirrer bar, 1.3789 g of lithium nitrate (Kanto Chemical Co., Inc., 3N5) with a purity of 99.95% and 18.6211 g of 2-butoxyethanol (ethylene glycol monobutyl ether) (Kanto Chemical Co., Inc., Cica Special Grade) were weighed. Then, the bottle was placed on a magnetic stirrer with a hot plate function, and lithium nitrate was completely dissolved in 2-butoxyethanol while stirring at 190° C. for 1 hour. The resulting solution was gradually cooled to room temperature (about 20° C.), whereby a 2-butoxyethanol solution of 1 mol/kg lithium nitrate was obtained. The purity of lithium nitrate can be measured using an ion chromatography-mass spectrometer.

Ethyl Alcohol Solution of 1 mol/kg Gallium Nitrate n-Hydrate

In a 20-g reagent bottle made of Pyrex equipped with a magnetic stirrer bar, 3.5470 g of gallium nitrate n-hydrate (n=5.5, Kojundo Chemical Laboratory Co., Ltd., 3N) and 6.4530 g of ethyl alcohol were weighed. Then, the bottle was placed on a magnetic stirrer with a hot plate function, and gallium nitrate n-hydrate (n=5.5) was completely dissolved in ethyl alcohol while stirring at 90° C. for 1 hour. The resulting solution was gradually cooled to room temperature, whereby an ethyl alcohol solution of 1 mol/kg gallium nitrate n-hydrate (n=5.5) was obtained. The hydration number n of the used gallium nitrate n-hydrate was 5.5 from the result of mass loss by a combustion experiment.

2-Butoxyethanol Solution of 1 mol/kg Lanthanum Nitrate Hexahydrate

In a 30-g reagent bottle made of Pyrex equipped with a magnetic stirrer bar, 8.6608 g of lanthanum nitrate hexahydrate (Kanto Chemical Co., Inc., 4N) and 11.3392 g of 2-butoxyethanol were weighed. Then, the bottle was placed on a magnetic stirrer with a hot plate function, and lanthanum nitrate hexahydrate was completely dissolved in 2-butoxyethanol while stirring at 140° C. for 30 minutes. The resulting solution was gradually cooled to room temperature, whereby a 2-butoxyethanol solution of 1 mol/kg lanthanum nitrate hexahydrate was obtained.

2-Butoxyethanol Solution of 1 mol/kg Neodymium Nitrate, Hydrous

In a 20-g reagent bottle made of Pyrex equipped with a magnetic stirrer bar, 4.2034 g of neodymium nitrate, hydrous (n=5, Kojundo Chemical Laboratory Co., Ltd., 4N) and 5.7966 g of 2-butoxyethanol were weighed. Then, the bottle was placed on a magnetic stirrer with a hot plate function, and neodymium nitrate, hydrous (n=5) was completely dissolved in 2-butoxyethanol while stirring at 140° C. for 30 minutes. The resulting solution was gradually cooled to room temperature, whereby a 2-butoxyethanol solution of 1 mol/kg neodymium nitrate, hydrous (n=5) was obtained. The hydration number n of the used neodymium nitrate, hydrous was 5 from the result of mass loss by a combustion experiment.

2-Butoxyethanol Solution of 1 mol/kg Calcium Nitrate Tetrahydrate

In a 20-g reagent bottle made of Pyrex equipped with a magnetic stirrer bar, 2.3600 g of calcium nitrate tetrahydrate (Kanto Chemical Co., Inc., 3N) and 7.6400 g of 2-butoxyethanol were weighed. Then, the bottle was placed on a magnetic stirrer with a hot plate function, and calcium nitrate tetrahydrate was completely dissolved in 2-butoxyethanol while stirring at 100° C. for 30 minutes. The resulting solution was gradually cooled to room temperature, whereby a 2-butoxyethanol solution of 1 mol/kg calcium nitrate tetrahydrate was obtained.

Butanol Solution of 1 mol/kg Zirconium Tetra-n-Butoxide

In a 20-g reagent bottle made of Pyrex equipped with a magnetic stirrer bar, 3.8368 g of zirconium tetra-n-butoxide (Wako Pure Chemical Industries, Ltd.) and 6.1632 g of butanol (n-butanol) were weighed. Then, the bottle was placed on a magnetic stirrer, and zirconium tetra-n-butoxide was completely dissolved in butanol while stirring at room temperature for 30 minutes, whereby a butanol solution of 1 mol/kg zirconium tetra-n-butoxide was obtained.

Preparation of Mixture

Subsequently, in Examples 1 to 5c (hereinafter also simply referred to as "Examples") and Comparative Examples 1a to 4 (hereinafter also simply referred to as "Comparative Examples"), according to the compositions of the first electrolyte portions shown in FIG. 7, solutions containing the precursors of the first electrolyte portion and the second electrolyte portion as mixtures were prepared.

Solution Containing Precursors of $Li_{5.5}Ga_{0.5}La_{2.99}Nd_{0.01}Zr_2O_{12}$ of Example 1

In Example 1, a solution containing the precursors of $Li_{5.5}Ga_{0.5}La_{2.99}Nd_{0.01}Zr_2O_{12}$ was prepared. First, in a glass beaker, 6.6000 g of the 2-butoxyethanol solution of 1 mol/kg lithium nitrate, 0.5000 g of the ethyl alcohol solution of 1 mol/kg gallium nitrate n-hydrate, 2.9900 g of the 2-butoxyethanol solution of 1 mol/kg lanthanum nitrate hexahydrate, 0.0100 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Example 1 was obtained.

Solution Containing Precursors of $Li_{5.5}Ga_{0.5}La_{2.96}Nd_{0.04}Zr_2O_{12}$ of Examples 2a and 2b In Examples 2a and 2b, a solution containing the precursors of $Li_{5.5}Ga_{0.5}La_{2.96}Nd_{0.04}Zr_2O_{12}$ was prepared. First, in a glass beaker, 6.6000 g of the 2-butoxyethanol solution of 1 mol/kg lithium nitrate, 0.5000 g of the ethyl alcohol solution of 1 mol/kg gallium nitrate n-hydrate, 2.9600 g of the 2-butoxyethanol solution of 1 mol/kg lanthanum nitrate hexahydrate, 0.0400 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Examples 2a and 2b was obtained.

Solution Containing Precursors of $Li_{5.5}Ga_{0.5}La_{2.96}Nd_{0.04}Zr_2O_{12}$ of Example 2c In Example 2c, a solution containing the precursors of $Li_{5.5}Ga_{0.5}La_{2.96}Nd_{0.04}Zr_2O_{12}$ was prepared. First, in a glass beaker, 7.1500 g of the 2-butoxyethanol solution of 1 mol/kg lithium nitrate, 0.5000 g of the ethyl alcohol solution of 1 mol/kg gallium nitrate n-hydrate, 2.9600 g of the 2-butoxyethanol solution of 1 mol/kg lanthanum nitrate hexahydrate, 0.0400 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Example 2c was obtained.

Solution Containing Precursors of $Li_{6.7}Ga_{0.1}La_{2.95}Nd_{0.05}Zr_2O_{12}$ of Examples 3a and 3b In Examples 3a and 3b, a solution containing the precursors of $Li_{6.7}Ga_{0.1}La_{2.95}Nd_{0.05}Zr_2O_{12}$ was prepared. First, in a glass beaker, 8.0400 g of the 2-butoxyethanol solution of 1 mol/kg lithium nitrate, 0.1000 g of the ethyl alcohol solution of 1 mol/kg gallium nitrate n-hydrate, 2.9500 g of the 2-butoxyethanol solution of 1 mol/kg lanthanum nitrate hexahydrate, 0.0500 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Examples 3a and 3b was obtained.

Solution Containing Precursors of $Li_4Ga_1La_{2.95}Nd_{0.05}Zr_2O_{12}$ of Example 4

In Example 4, a solution containing the precursors of $Li_4Ga_1La_{2.95}Nd_{0.05}Zr_2O_{12}$ was prepared. First, in a glass beaker, 4.8000 g of the 2-butoxyethanol solution of 1 mol/kg lithium nitrate, 1.0000 g of the ethyl alcohol solution of 1 mol/kg gallium nitrate n-hydrate, 2.9500 g of the 2-butoxyethanol solution of 1 mol/kg lanthanum nitrate hexahydrate, 0.0500 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Example 4 was obtained.

Solution Containing Precursors of $Li_{5.2}Ga_{0.6}La_{2.8}Nd_{0.2}Zr_2O_{12}$ of Examples 5a and 5b In Examples 5a and 5b, a solution containing the precursors of $Li_{5.2}Ga_{0.6}La_{2.8}Nd_{0.2}Zr_2O_{12}$ was prepared. First, in a glass beaker, 6.2400 g of the 2-butoxyethanol solution of 1 mol/kg lithium nitrate, 0.6000 g of the ethyl alcohol solution of 1 mol/kg gallium nitrate n-hydrate, 2.8000 g of the 2-butoxyethanol solution of 1 mol/kg lanthanum nitrate hexahydrate, 0.2000 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Examples 5a and 5b was obtained.

Solution Containing Precursors of $Li_{5.2}Ga_{0.6}La_{2.8}Nd_{0.2}Zr_2O_{12}$ of Example 5c In Example 5c, a solution containing the precursors of $Li_{5.2}Ga_{0.6}La_{2.8}Nd_{0.2}Zr_2O_{12}$ was prepared. First, in a glass beaker, 6.7600 g of the 2-butoxyethanol solution of 1 mol/kg lithium nitrate, 0.6000 g of the ethyl alcohol solution of 1 mol/kg gallium nitrate n-hydrate, 2.8000 g of the 2-butoxyethanol solution of 1 mol/kg lanthanum nitrate hexahydrate, 0.2000 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein.

Subsequently, stirring was performed at room temperature for 30 minutes using a magnetic stirrer, whereby a mixture of Example 5c was obtained.

Solution Containing Precursors of $Li_{5.5}Ga_{0.5}La_{2.79}Nd_{0.21}Zr_2O_{12}$ of Comparative Examples 1a and 1b In Comparative Examples 1a and 1b, a solution containing the precursors of $Li_{5.5}Ga_{0.5}La2.79Nd_{0.21}Zr_2O_{12}$ was prepared. First, in a glass beaker, 6.6000 g of the 2-butoxyethanol solution of 1 mol/kg lithium nitrate, 0.5000 g of the ethyl alcohol solution of 1 mol/kg gallium nitrate n-hydrate, 2.7900 g of the 2-butoxyethanol solution of 1 mol/kg lanthanum nitrate hexahydrate, 0.2100 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Comparative Examples 1a and 1b was obtained.

Solution Containing Precursors of $Li_{5.5}Ga_{0.5}La_3Zr_2O_{12}$ of Comparative Example 2

In Comparative Example 2, a solution containing the precursors of $Li_{5.5}Ga_{0.5}La_3Zr_2O_{12}$ was prepared. First, in a glass beaker, 6.6000 g of the 2-butoxyethanol solution of 1 mol/kg lithium nitrate, 0.5000 g of the ethyl alcohol solution of 1 mol/kg gallium nitrate n-hydrate, 3.0000 g of the 2-butoxyethanol solution of 1 mol/kg lanthanum nitrate hexahydrate, and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Comparative Example 2 was obtained. The mixture of Comparative Example 2 does not contain neodymium (Nd).

Solution Containing Precursors of $Li_{5.5}Ga_{0.5}La_{2.96}Ca_{0.04}Zr_2O_{12}$ of Comparative Examples 3a and 3b In Comparative Examples 3a and 3b, a solution containing the precursors of $Li_{5.5}Ga_{0.5}La_{2.96}Ca_{0.04}Zr_2O_{12}$ was prepared. First, in a glass beaker, 6.6000 g of the 2-butoxyethanol solution of 1 mol/kg lithium nitrate, 0.5000 g of the ethyl alcohol solution of 1 mol/kg gallium nitrate n-hydrate, 2.9600 g of the 2-butoxyethanol solution of 1 mol/kg lanthanum nitrate hexahydrate, 0.0400 g of the 2-butoxyethanol solution of 1 mol/kg calcium nitrate tetrahydrate, and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Comparative Examples 3a and 3b was obtained. The mixture of Comparative Examples 3a and 3b does not contain neodymium (Nd), but contains calcium (Ca) instead.

Solution Containing Precursors of $Li_7La_3Zr_2O_{12}$ of Comparative Example 4

In Comparative Example 4, a solution containing the precursors of $Li_7La_3Zr_2O_{12}$ was prepared. First, in a glass beaker, 7.0000 g of the 2-butoxyethanol solution of 1 mol/kg lithium nitrate, 3.0000 g of the 2-butoxyethanol solution of 1 mol/kg lanthanum nitrate hexahydrate, and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Comparative Example 4 was obtained. The mixture of Comparative Example 4 does not contain gallium (Ga) or neodymium (Nd).

In the mixtures (the solutions containing the precursors) of Examples and Comparative Examples, in consideration of the volatilization amount (release amount) of lithium by heating in a post-process, the 2-butoxyethanol solution of 1 mol/kg lithium nitrate was blended in an amount 1.30 times the molar ratio with respect to each of the predetermined theoretical compositions at the level of setting the below-mentioned firing temperature to 1000° C. (Examples 2c and 5c). On the other hand, at the other levels, the 2-butoxyethanol solution of 1 mol/kg lithium nitrate was blended in an amount 1.20 times the molar ratio with respect to each of the predetermined theoretical compositions. The other metal compound solutions were blended in an equimolar ratio with respect to the theoretical compositions.

Production of Solid Electrolyte Pellet

Solid electrolyte pellets (pellets of the first electrolyte portion) for evaluation are produced using the mixtures of Examples and Comparative Examples prepared above. As the second electrolyte portion shown in FIG. 7, those included in the electrolytes when producing the lithium batteries of Examples and Comparative Examples are shown. The below-mentioned evaluation of the solid electrolyte pellet is the evaluation of the first electrolyte portion alone.

First, the solution containing the precursors is placed in a titanium dish having an inner diameter of 50 mm and a height of 20 mm. This dish is placed on a hot plate and heated for 1 hour by setting the set temperature of the hot plate to 180° C. to remove the solvent. Subsequently, the dish is heated for 30 minutes by setting the set temperature of the hot plate to 360° C. to decompose most of the contained organic components by combustion. Thereafter, the dish is heated for 1 hour by setting the set temperature of the hot plate to 540° C. to burn and decompose the remaining organic components. Thereafter, the dish is gradually cooled to room temperature on the hot plate, whereby a 540° C.-calcined body is obtained.

Subsequently, the 540° C.-calcined body is transferred to an agate mortar and sufficiently ground and mixed. A 0.2000-g portion is weighed out of the mortar and pressed at a pressure of 0.624 kN/mm² (624 MPa) for 5 minutes using a molding die (a die with an exhaust port having an inner diameter of 10 mm), whereby a 540° C.-calcined body pellet (a disk-shaped molded material of the 540° C.-calcined body) is produced.

Then, the 540° C.-calcined body pellet is subjected to firing (main firing) under the firing conditions shown in FIG. 7. Specifically, the 540° C.-calcined body pellet is placed in a pot made of magnesium oxide, the pot is covered with a lid made of magnesium oxide, and then, firing is performed under the respective firing conditions in an electric muffle furnace FP311 (product name, Yamato Scientific Co., Ltd.). The firing conditions were set as follows: 800° C. for 9 hours in Examples 2a and 5a and Comparative Example 3a, 1000° C. for 8 hours in Examples 2c and 5c, and 900° C. for 8 hours in the other Examples and Comparative Examples. Subsequently, the electric muffle furnace is gradually cooled to room temperature, and then, the pellet is taken out and used as a solid electrolyte pellet for evaluation having a diameter of about 9.5 mm and a thickness of about 800 μm.

The above operation was performed for the solutions containing the precursors of Examples and Comparative Examples, whereby the respective solid electrolyte pellets were produced. Since the solid electrolytes (first electrolyte portions) of Example 3b and Comparative Example 1b are the same as the first electrolyte portions of Example 3a and Comparative Example 1a, respectively, the evaluation of the solid electrolyte pellets was omitted.

Evaluation of Solid Electrolyte

Lithium Ion Conduction Property

With respect to each of the solid electrolyte pellets of Examples and Comparative Examples, as the index of the lithium ion conduction property, the lithium ion conductivity was evaluated by the following method.

A lithium electrode (non-ion blocking electrode) having a diameter of 8 mm was produced by lithium vapor deposition on both front and back faces of the solid electrolyte pellet. Subsequently, by using an impedance analyzer SI 1260 (Solartron, Inc.), AC impedance measurement was performed. In the measurement, the AC amplitude was set to 10 mV and the measurement frequency was set to $10^7$ Hz to $10^{-1}$ Hz.

Figure 8:
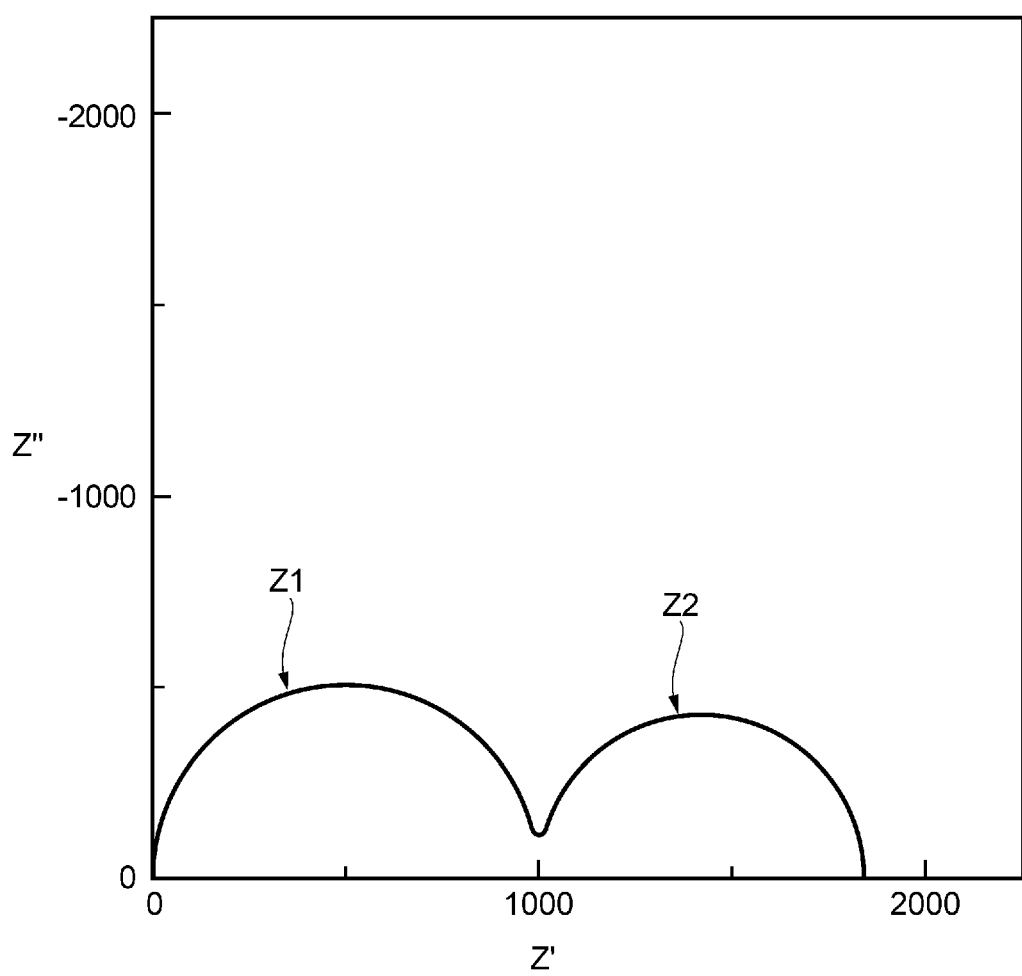
FIG. 8 is a graph showing a Cole-Cole plot which is the impedance spectrum of Comparative Example 2.

An explanation will be provided by using Comparative Example 2 as one example of a Cole-Cole plot which is an obtained impedance spectrum. FIG. 8 is a graph showing a Cole-Cole plot which is the impedance spectrum of Comparative Example 2. In FIG. 8, the horizontal axis represents the real component (Z') of the impedance and the vertical axis represents the imaginary component (Z") of the impedance. Further, the grain bulk component of the spectrum is denoted by Z1, and the grain boundary component of the spectrum is denoted by Z2 in FIG. 8. Further, the dispersion of resistance in a low frequency region is caused by the ion blocking electrode. With respect to the solid electrolyte pellets of Examples and Comparative Examples, the lithium ion conductivities (the grain bulk conductivity, the grain boundary conductivity, and the total ion conductivity) were calculated from Z1 and Z2 and shown in FIG. 9. In the impedance spectrum (Cole-Cole plot) of Comparative Example 4, the grain bulk component and the grain boundary component were integrated and could not be separated. Therefore, in Comparative Example 4, only the total ion conductivity was calculated, and the symbol "-" is entered in the columns of the grain bulk component and the grain boundary component.

Raman Scattering Analysis

With respect to each of the solid electrolyte pellets of Examples and Comparative Examples, Raman scattering analysis was performed. Specifically, a Raman scattering spectrum was obtained using a Raman spectrometer S-2000 (JEOL Ltd.), and the crystal system of each solid electrolyte pellet was confirmed. With respect to the crystal system, a cubic crystal is denoted by "c", a tetragonal crystal is denoted by "t", and the coexistence of a tetragonal crystal and a cubic crystal is denoted by "t+c" in FIG. 9.

XRD Analysis

With respect to each of the solid electrolyte pellets of Examples and Comparative Examples, X-ray diffraction (XRD) analysis was performed. Specifically, byproduction of impurities was examined using an X-ray diffractometer MRD (Philips). As representative examples, the X-ray diffraction charts of Example 1, Comparative Example 1a, and Comparative Example 2 are shown in FIG. 10A, and the X-ray diffraction charts of Example 2a and Comparative Example 3b are shown in FIG. 10B.

Byproduction of impurities in the solid electrolyte pellet will be described with reference to FIGS. 10A and 10B. FIG. 10A is a diagram showing the X-ray diffraction charts of the solid electrolyte pellets of Example 1, Comparative Example 1a, and Comparative Example 2. FIG. 10B is a diagram showing the X-ray diffraction charts of the solid electrolyte pellets of Example 2a and Comparative Example 3b. In FIGS. 10A and 10B, the horizontal axis represents 2θ and the vertical axis represents an intensity (Intensity (a.u.)).

Figure 10A:
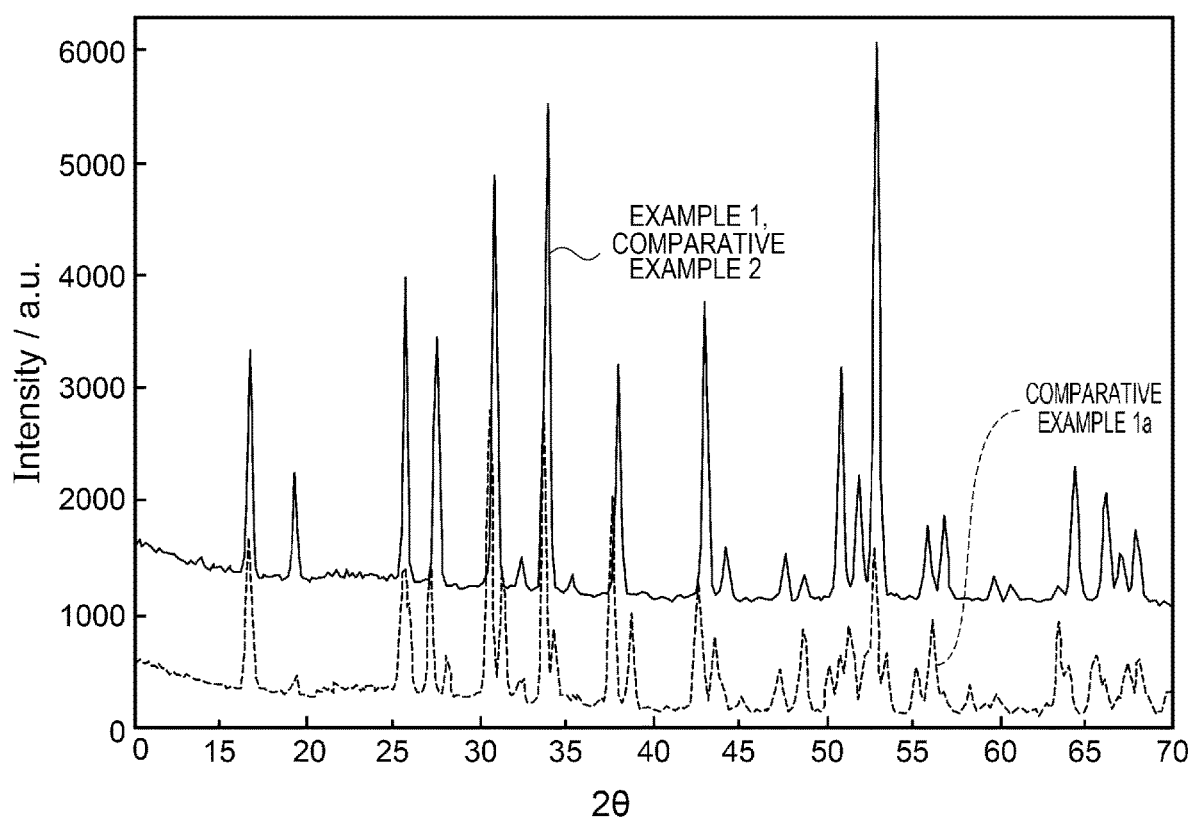
FIG. 10A is a diagram showing the X-ray diffraction charts of Example 1, Comparative Example 1a, and Comparative Example 2.

As shown in FIG. 10A, in Example 1 and Comparative Example 2, only diffraction peaks based on a single garnet-type crystal structure were observed, and byproduction of impurities was not confirmed. On the other hand, in Comparative Example 1a, diffraction peaks based on two garnet-type crystal structures having different crystal lattices were observed, and therefore, byproduction of impurities was confirmed. The coexistence of impurities causes a decrease in the lithium ion conduction property.

Figures 10B, 11:
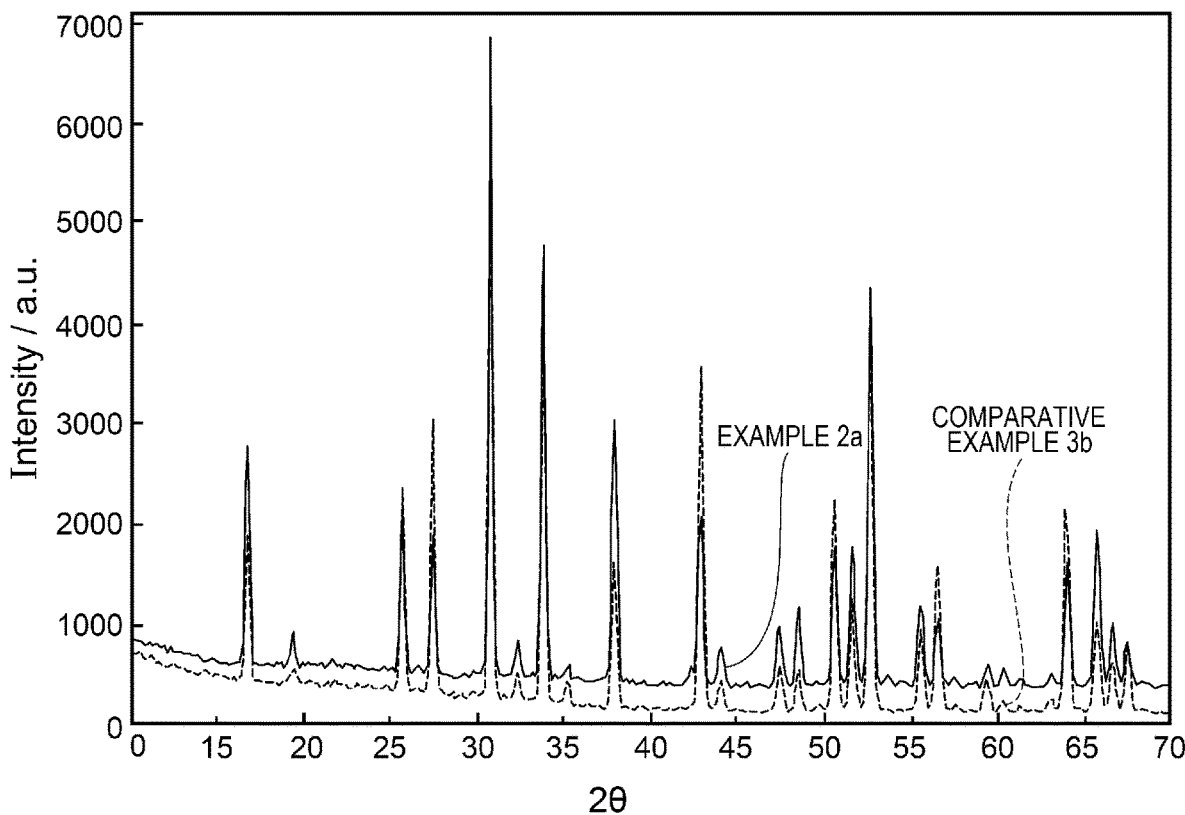
FIG. 10B is a diagram showing the X-ray diffraction charts of Example 2a and Comparative Example 3b.
FIG. 11 is a table showing the TG-DTA measurement results of Example 2b and Comparative Example 3b.

As shown in FIG. 10B, in Example 2a and Comparative Example 3b, only diffraction peaks based on a single garnet-type crystal structure were observed, and byproduction of impurities was not confirmed.

Also with respect to the other Examples and Comparative Examples, byproduction of impurities was examined by performing X-ray diffraction analysis as described above. The result, that is, the presence or absence of byproduction of impurities is shown in FIG. 9.

The evaluation results of the solid electrolyte pellets described above will be described with reference to FIG. 9. FIG. 9 is a table showing the evaluation results of lithium ion conductivities, crystal systems, and impurities according to Examples and Comparative Examples.

As shown in FIG. 9, in the case of the solid electrolyte pellets of Examples 1 to 5c, the total ion conductivity was $1.0 \times 10^{-4}$ S/cm or more. It was found that in particular, also with respect to the total ion conductivities of Examples 2a and 5a in which the firing conditions were set to 800° C. and 9 hours and the firing temperature was set lower than the other Examples, a total ion conductivity of $1.0 \times 10^{-4}$ S/cm was ensured. Further, in all the Examples for which evaluation was performed, the crystal system was a cubic crystal, and byproduction of impurities was not confirmed. From the above evaluation results, it was shown that the solid electrolytes of Examples 1 to 5c have an excellent lithium ion conduction property and are suitable as a solid electrolyte.

On the other hand, in the case of the solid electrolyte pellets of Comparative Examples 1a to 4, the total ion conductivity was less than $1.0 \times 10^{-4}$ S/cm except for Comparative Example 1a. It was also found that in Comparative Example 3a, the coexistence of a tetragonal crystal and a cubic crystal was confirmed, and in Comparative Example 4, the crystal system was a tetragonal crystal. Further, it was found that in Comparative Example 1a, although the total ion conductivity was $1.0 \times 10^{-4}$ S/cm or more, byproduction of impurities occurs. From the above results, it was found that the solid electrolytes of Comparative Examples 1a to 4 are inferior to those of Examples.

Thermal Analysis

Next, with respect to the mixtures (the solutions containing the precursors) of Example 2b and Comparative Example 3b, the tetragonal crystal formation temperature, the tetragonal-cubic phase transition temperature, and the melting point were measured by thermal analysis. Specifically, by using the above-mentioned thermogravimetric differential thermal analyzer TG-DTA 2000SA (product name, Bruker AXS GmbH), about 25 mg of the mixture was weighed out in an alumina sample pan. The blank level was defined as the sample pan in an empty state. The measurement temperature conditions were set as follows. First, the temperature was increased from 25° C. to 1300° C. (temperature increasing rate: 10° C./min), and then maintained at 1300° C. for 10 minutes, and thereafter decreased to 25° C. (temperature decreasing rate: 20° C./min). The measurement atmosphere was a dry air atmosphere (flow rate: 100 mL/min). The measurement was performed under the above-mentioned measurement conditions.

From the TG-DTA charts obtained by the above-mentioned TG-DTA measurement, the tetragonal crystal formation temperature, the tetragonal-cubic phase transition temperature, and the melting point were calculated and shown in FIG. 11. FIG. 11 is a table showing the TG-DTA measurement results of Example 2b and Comparative Example 3b.

As shown in FIG. 11, the tetragonal crystal formation temperature and the melting point of Example 2b are closer to those of Comparative Example 3b, however, the tetragonal-cubic phase transition temperature of Example 2b is lower than that of Comparative Example 3b by about 50° C. This is derived from the fact that while the composition of the solid electrolyte of Comparative Example 3b is $Li_{5.5}Ga_{0.5}La_{2.96}Ca_{0.04}Zr_2O_{12}$, the composition of the solid electrolyte of Example 2b is a composition in which calcium (Ca) has been substituted with neodymium (Nd) ($Li_{5.5}Ga_{0.5}La_{2.96}Nd_{0.04}Zr_2O_{12}$). That is, by substituting calcium (Ca) with neodymium (Nd), the tetragonal-cubic phase transition temperature can be lowered. By the lowering of the tetragonal-cubic phase transition temperature, the bulk growth in the solid electrolyte is enhanced, and the ion conductivity at a grain boundary (grain boundary conductivity) is improved. As shown in FIG. 9, this is also obvious from the result in which the grain boundary conductivity was $1.0 \times 10^{-4}$ S/cm in Comparative Example 3b, but was improved to $2.6 \times 10^{-4}$ S/cm in Example 2b.

Production of Lithium Battery

Lithium batteries were produced by the above-mentioned production method using the mixtures (the solutions containing the precursors) of Examples and Comparative Examples. Specifically, $LiCoO_2$ was used as the positive electrode active material, a lithium foil (thickness: about 150 μm) was used as the negative electrode, and a copper foil (thickness: about 100 μm) was used as the first current collector and the second current collector. The thickness of the positive electrode was set to about 150 μm, the thickness of the electrolyte layer was set to about 15 μm, and the effective diameter was set to about 8 mm. The electrolytes (the compositions of the first electrolyte portions, the firing conditions, etc.) constituting the lithium batteries are as shown in FIG. 7. In Example 3b and Comparative Example 1b, the electrolyte was formed from only the first electrolyte portion by repeatedly performing the formation of the second molded body (step S3) without forming the second electrolyte portion. Further, in Example 2c and Example 5c, a coating was applied to the active material $LiCoO_2$ using the above-mentioned $LiNbO_3$ and $BaTiO_3$, respectively. Hereinafter, a detailed method therefor will be described. First, metal compound solutions for preparing a coating agent are prepared.

2-Butoxyethanol Solution of 0.05 mol/kg Lithium Nitrate

In a 100-g reagent bottle made of Pyrex (trademark of Corning Incorporated) equipped with a magnetic stirrer bar, 0.1724 g of lithium nitrate (Kanto Chemical Co., Inc., 3N5) with a purity of 99.95% and 49.8276 g of 2-butoxyethanol (ethylene glycol monobutyl ether) (Kanto Chemical Co., Inc., Cica Special Grade) were weighed. Then, the bottle was placed on a magnetic stirrer with a hot plate function pre-heated to 160° C., and stirring was performed at 350 rpm for 30 minutes until lithium nitrate was completely dissolved. Thereafter, the resulting solution was gradually cooled to room temperature (about 20° C.), whereby a 2-butoxyethanol solution of 0.05 mol/kg lithium nitrate was obtained.

2-Butoxyethanol Solution of 0.05 mol/kg Niobium Pentaethoxide

In a 100-g reagent bottle made of Pyrex (trademark of Corning Incorporated) equipped with a magnetic stirrer bar, 0.7955 g of niobium pentaethoxide (Wako Pure Chemical Industries, Ltd.) and 49.2045 g of 2-butoxyethanol (ethylene glycol monobutyl ether) (Kanto Chemical Co., Inc., Cica Special Grade) were weighed. Then, the bottle was placed on a magnetic stirrer, and stirring was performed at 350 rpm for 10 minutes at room temperature (about 20° C.) until niobium pentaethoxide was completely dissolved. By doing this, a 2-butoxyethanol solution of 0.05 mol/kg niobium pentaethoxide was obtained.

Acetic Acid Solution of 1 mol/kg Barium Acetate

In a 10-g reagent bottle made of Pyrex (trademark of Corning Incorporated) equipped with a magnetic stirrer bar, 0.5108 g of barium acetate (Wako Pure Chemical Industries, Ltd., Reagent Special Grade) and 1.4892 g of acetic acid (Kanto Chemical Co., Inc., Special Grade) were weighed. Then, the bottle was placed on a magnetic stirrer with a hot plate function pre-heated to 120° C., and stirring was performed at 350 rpm for 30 minutes until barium acetate was completely dissolved. By doing this, an acetic acid solution of 1 mol/kg barium acetate was obtained.

Acetic Acid 2-Butoxyethanol Solution of 0.5 mol/kg Barium Acetate

In a 10-g reagent bottle made of Pyrex (trademark of Corning Incorporated) equipped with a magnetic stirrer bar, 2.0000 g of the acetic acid solution of 1 mol/kg barium acetate and 2.0000 g of 2-butoxyethanol (ethylene glycol monobutyl ether) (Kanto Chemical Co., Inc., Cica Special Grade) were weighed. Then, the bottle was placed on a magnetic stirrer, and stirring was performed at 350 rpm for 10 minutes at room temperature (about 20° C.) so as to achieve sufficient mixing. By doing this, an acetic acid 2-butoxyethanol solution of 0.5 mol/kg barium acetate was obtained.

2-Butoxyethanol Solution of 0.5 mol/kg Titanium Tetraisopropoxide

In a 20-g reagent bottle made of Pyrex (trademark of Corning Incorporated) equipped with a magnetic stirrer bar, 0.5861 g of titanium tetraisopropoxide (purity: 97 mass %, Sigma-Aldrich Co. LLC.) and 3.4139 g of 2-butoxyethanol (ethylene glycol monobutyl ether) (Kanto Chemical Co., Inc., Cica Special Grade) were weighed. Then, the bottle was placed on a magnetic stirrer, and stirring was performed at 350 rpm for 10 minutes at room temperature (about 20° C.) until titanium tetraisopropoxide was completely dissolved. By doing this, a 2-butoxyethanol solution of 0.5 mol/kg titanium tetraisopropoxide was obtained.

Subsequently, a coating agent is prepared from the prepared metal compound solutions.

Preparation of LiNbO$_3$ Coating Agent for Example 2c

Subsequently, as an LiNbO$_3$ coating agent, a 2-butoxyethanol solution of 0.05 mol/kg lithium niobate was prepared. Specifically, in a 50-g reagent bottle made of Pyrex (trademark of Corning Incorporated) equipped with a magnetic stirrer bar, 4.5000 g of the 2-butoxyethanol solution of 0.05 mol/kg lithium nitrate, 5.0000 g of the 2-butoxyethanol solution of 0.05 mol/kg niobium pentaethoxide, and 0.0340 g of Triton (registered trademark) X-100 (trade name, MP Biomedicals, Inc.) as a nonionic surfactant were weighed. Then, the bottle was placed on a magnetic stirrer, and stirring was performed at 350 rpm for 10 minutes at room temperature (about 20° C.) so as to achieve sufficient mixing. By doing this, a 2-butoxyethanol solution of 0.05 mol/kg lithium niobate was obtained. In consideration of the single phase formation of LiNbO$_3$, the coating agent was prepared by setting the molar ratio of lithium (Li) to 0.90 times and the molar ratio of niobium (Nb) to 1 time.

Preparation of BaTiO$_3$ Coating Agent for Example 5c

Subsequently, as a BaTiO$_3$ coating agent, an acetic acid 2-butoxyethanol solution of 0.5 mol/kg barium titanate was prepared. Specifically, in a 50-g reagent bottle made of Pyrex (trademark of Corning Incorporated) equipped with a magnetic stirrer bar, 1.8800 g of the acetic acid 2-butoxyethanol solution of 0.5 mol/kg barium acetate and 0.2723 g of LDS (trade name, Acros Organics, Inc.) of an alkylsulfate ester salt as an anionic surfactant were weighed. Then, the bottle was placed on a magnetic stirrer with a hot plate function pre-heated to 120° C., and stirring was performed at 350 rpm for 30 minutes so as to achieve sufficient mixing. Thereafter, the resulting solution was gradually cooled to room temperature (about 20° C.), and 2.0000 g of the 2-butoxyethanol solution of 0.5 mol/kg titanium tetraisopropoxide was weighed and added to the solution. Then, the bottle was placed on a magnetic stirrer, and stirring was performed at 350 rpm for 10 minutes at room temperature (about 20° C.) so as to achieve sufficient mixing. By doing this, an acetic acid 2-butoxyethanol solution of 0.5 mol/kg barium titanate was obtained. In consideration of the single phase formation of BaTiO$_3$, the coating agent was prepared by setting the molar ratio of barium (Ba) to 0.9 times and the molar ratio of titanium (Ti) to 1 time.

Coating of Active Material in Example 2c

Subsequently, by using the LiNbO$_3$ coating agent, a coating was applied to the active material LiCoO$_2$. Specifically, in a 50-g reagent bottle made of Pyrex (trademark of Corning Incorporated) equipped with a magnetic stirrer bar, 9.5340 g of the 2-butoxyethanol solution of 0.05 mol/kg lithium niobate and 10.0000 g of LiCoO$_2$ (5H, Nippon Chemical Industrial Co., Ltd.) in the form of particles were weighed. Then, the reagent bottle was placed in a table top ultrasonic cleaner US-1 (product name, SND Co., Ltd.) storing water heated to 55° C. in a water tank, and an ultrasonic wave was applied to the reagent bottle for 2 hours. Thereafter, the reagent bottle was taken out and centrifuged at 10000 rpm for 15 minutes using a large centrifuge Suprema (registered trademark) 21 (product name, Tomy Seiko Co., Ltd.). Thereafter, the supernatant solvent was removed, and the active material LiCoO$_2$ particles having the coating agent attached to the surfaces were separated. The LiCoO$_2$ particles were transferred to a titanium dish and the dish was placed on a hot plate, and the hot plate was heated to 90° C. and maintained for 30 minutes to evaporate the solvent of the coating agent. Thereafter, the temperature of the hot plate was increased to 360° C. and maintained for 30 minutes, thereby burning and decomposing the organic components. Subsequently, the temperature of the hot plate was increased to 540° C. and maintained for 1 hour, thereby decomposing the remaining organic substances and coating the surfaces of the LiCoO$_2$ particles with LiNbO$_3$. Thereafter, the LiCoO$_2$ particles were gradually cooled to about 20° C., whereby the active material LiCoO$_2$ for Example 2c coated with LiNbO$_3$ was obtained.

With respect to the obtained active material LiCoO$_2$ for Example 2c, X-ray diffraction analysis, TEM (transmission electron microscope) observation, and energy dispersive X-ray analysis were performed, and as a result, it was confirmed that an impurity phase is not observed in the LiNbO$_3$ coating. Further, the thickness of the coating was measured by TEM and found to be about 3 nm. The thickness of the coating can be adjusted by the concentrations of lithium (Li) and niobium (Nb) in the coating agent.

Coating of Active Material in Example 5c

Subsequently, by using the BaTiO$_3$ coating agent, a coating was applied to the active material LiCoO$_2$. Specifically, in a 50-g reagent bottle made of Pyrex (trademark of Corning Incorporated) equipped with a magnetic stirrer bar, 19.0000 g of the acetic acid 2-butoxyethanol solution of 0.5 mol/kg barium titanate and 10.0000 g of LiCoO$_2$ (5H, Nippon Chemical Industrial Co., Ltd.) in the form of particles were weighed. Then, the reagent bottle was placed in a table top ultrasonic cleaner US-1 (product name, SND Co., Ltd.) storing water heated to 30° C. in a water tank, and an ultrasonic wave was applied to the reagent bottle for 2 hours. Thereafter, the reagent bottle was taken out and centrifuged at 10000 rpm for 15 minutes using a large centrifuge Suprema (registered trademark) 21 (product name, Tomy Seiko Co., Ltd.). Thereafter, the supernatant solvent was removed, and the active material LiCoO$_2$ particles having the coating agent attached to the surfaces were separated. The LiCoO$_2$ particles were transferred to a titanium dish and the dish was placed on a hot plate, and the hot plate was heated to 90° C. and maintained for 30 minutes to evaporate the solvent of the coating agent. Thereafter, the temperature of the hot plate was increased to 360° C. and maintained for 30 minutes, thereby burning and decomposing the organic components. Subsequently, the temperature of the hot plate was increased to 540° C. and maintained for 1 hour, thereby decomposing the remaining organic substances and calcining BaTiO$_3$ attached to the surfaces of the LiCoO$_2$ particles. Subsequently, firing was performed in the atmosphere at 900° C. for 8 hours using an electric muffle furnace FP311 (Yamato Scientific Co., Ltd.). Thereafter, the resulting material was gradually cooled to about 20° C., whereby the active material LiCoO$_2$ for Example 5c coated with BaTiO$_3$ was obtained.

With respect to the obtained active material LiCoO$_2$ for Example 5c, X-ray diffraction analysis, TEM (transmission electron microscope) observation, and energy dispersive X-ray analysis were performed, and as a result, it was confirmed that an impurity phase is not observed in the BaTiO$_3$ coating. Further, it was found that BaTiO$_3$ particles with a size of about 50 nm cover approximately 50% of the surface of the active material LiCoO$_2$.

In Examples 2c and 5c in which the active material LiCoO$_2$ was produced by the above-mentioned method, lithium batteries were produced by performing the subsequent production steps in the same manner as in the other Examples and Comparative Examples.

Evaluation of Battery Characteristics

With respect to the lithium batteries of Examples and Comparative Examples, charge and discharge were performed in an environment at 25° C., and the discharge capacity retention was evaluated as an index of the battery characteristics. The charge and discharge conditions at this time are shown in FIG. 12. FIG. 12 is a table showing the charge and discharge conditions and the evaluation results of the lithium batteries of Examples and Comparative Examples.

As shown in FIG. 12, in Example 2c, the charge and discharge currents were set to 250 μA (charge and discharge rates: 0.5 C), and in Example 5c, the charge and discharge currents were set to 500 μA (charge and discharge rates: 1.0 C). In the other Examples and Comparative Examples, the charge and discharge currents were set to 100 μA (charge and discharge rates: 0.2 C).

The charge and discharge capacities when the above-mentioned charge and discharge were repeated were measured. Specifically, the charge and discharge capacities at the initial time (1st cycle) and the charge and discharge capacities after repeating 10 cycles of charge and discharge (10th cycle) were measured, and the discharge capacity retention after the 10th charge and discharge cycle with respect to the 1st charge and discharge cycle was calculated. The results are shown in FIG. 12.

As shown in FIG. 12, it was found that in any of the lithium batteries of Examples 1 to 5c, a discharge capacity retention of 90% or more can be ensured. This showed that the lithium batteries of Examples have stable cycle characteristics and excellent battery characteristics. Further, in Examples 2c and 5c in which a coating was applied to the surface of the active material, the discharge capacity retention was 95% although the charge and discharge conditions were made severer than the other Examples. That is, it was shown that by applying a coating of LiNbO$_3$ or BaTiO$_3$ to the surface of the active material, the battery characteristics are further improved.

On the other hand, in the lithium batteries of Comparative Examples, it was found that a discharge capacity retention of 80% cannot be ensured, and the cycle characteristics are not stable and the battery characteristics are poor as compared with Examples.

Second Embodiment

Method for Producing Battery

Figure 13:
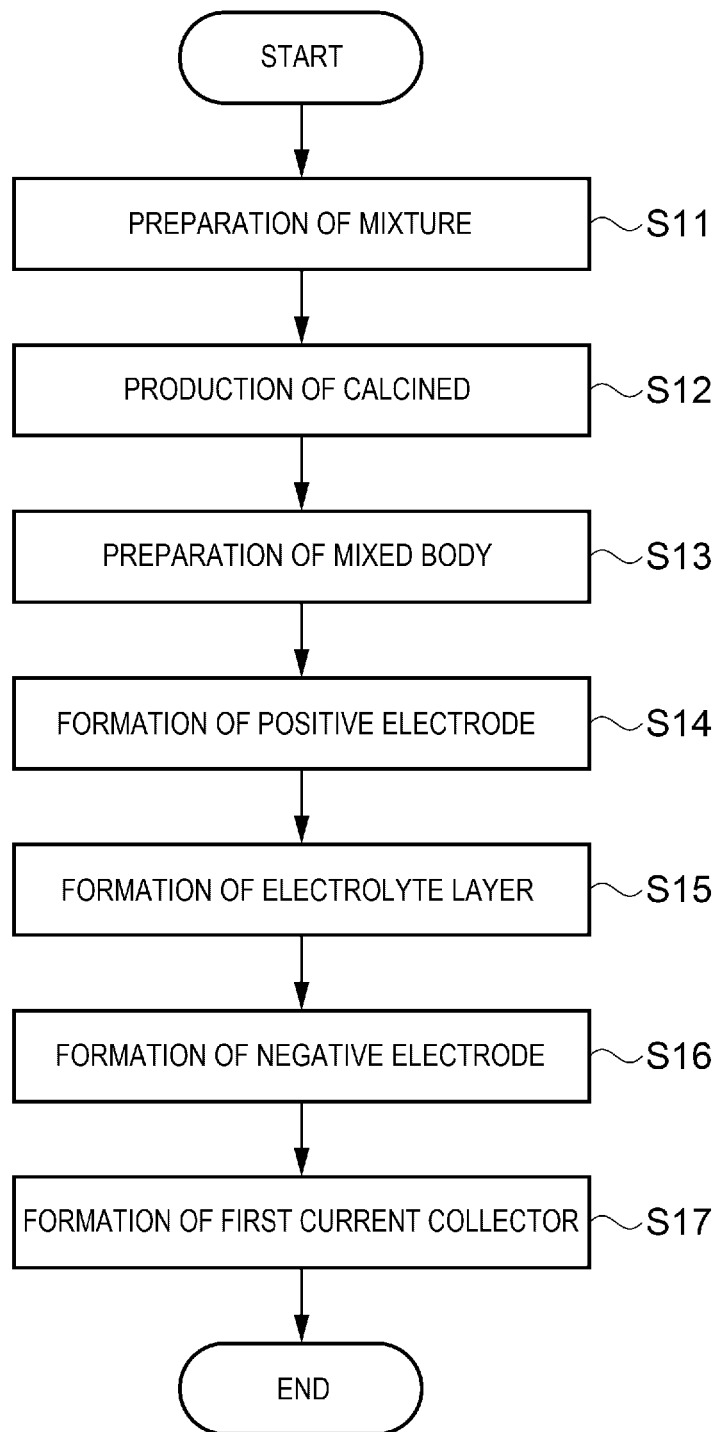
FIG. 13 is a process flowchart showing a method for producing a lithium battery as a battery according to a second embodiment.

A method for producing a lithium battery as a battery according to this embodiment will be described with reference to FIG. 13. FIG. 13 is a process flowchart showing a method for producing a lithium battery as a battery according to the second embodiment. In the production method of this embodiment, a method for producing a first electrolyte portion is included. The process flow shown in FIG. 13 is an example, and the method is not limited thereto. Further, the same reference numerals are used for the same constituent components as those of the first embodiment, and a repetitive description will be omitted.

The method for producing a lithium battery of this embodiment is a production method for directly forming a positive electrode as a composite body from a calcined body which is a forming material of a first electrolyte portion and an active material without forming a first molded body.

As shown in FIG. 13, the method for producing a lithium battery of this embodiment includes the following steps. In a step S11, a mixture is prepared by mixing a plurality of types of raw materials containing elements constituting a lithium composite metal oxide represented by the following compositional formula (1). In a step S12, a calcined body is produced by subjecting the mixture to a first heating treatment. In a step S13, a mixed body is prepared by mixing the calcined body with an active material. In a step S14, a positive electrode including a crystalline first electrolyte portion and the active material is formed by molding the mixed body, followed by performing a second heating treatment. In a step S15, an electrolyte layer is formed on one side of the positive electrode. In a step S16, a negative electrode is formed through the electrolyte layer so as to come into contact with the electrolyte layer. In a step S17, a first current collector is formed on the other side of the positive electrode.

$$(Li_{7-3x}Ga_x)(La_{3-y}Nd_y)Zr_2O_{12} \qquad (1)$$

In the formula (1), x and y satisfy the following formulae: 0.1≤x≤1.0 and 0.01≤y≤0.2.

Preparation of Mixture

In the step S11 shown in FIG. 13, in the same manner as in the first embodiment, a mixture containing the precursors as the raw materials of a first electrolyte portion is prepared. Then, the process proceeds to the step S12.

Production of Calcined Body

In the step S12, a calcined body is produced from the mixture. Specifically, the mixture is subjected to a first heating treatment, whereby removal of the solvent by volatilization and removal of the organic components by combustion or thermal decomposition are performed. The heating temperature is set to 500° C. or higher and 650° C. or lower. Subsequently, a solid material of the obtained mixture is ground and mixed, whereby a calcined body in the form of a powder is produced. Then, the process proceeds to the step S13.

Preparation of Mixed Body

In the step S13, the calcined body in the form of a powder and an active material are mixed, whereby a mixed body is prepared. First, an active material is prepared. Also in this embodiment, in the same manner as in the first embodiment, LiCoO$_2$ subjected to a classification operation is used as the active material. Here, a coating of LiNbO$_3$ or BaTiO$_3$ may be applied to the active material in the same manner as in the above-mentioned embodiment. Subsequently, 0.0550 g of the calcined body in the form of a powder and 0.0450 g of LiCoO$_2$ are sufficiently stirred and mixed, whereby 0.1000 g of a mixed body is formed. Then, the process proceeds to the step S14.

Formation of Positive Electrode

In the step S14, a positive electrode as a composite body is formed. Specifically, by using a molding die 86 (see FIG. 6C), the mixed body is compression molded. For example, the mixed body is pressed at a pressure of 1019 MPa for 2 minutes using the molding die 86 (a die with an exhaust port having an inner diameter of 10 mm), whereby a disk-shaped molded material (diameter: 10 mm, effective diameter: 8 mm, thickness: 350 μm) of the mixed body is produced.

Thereafter, the disk-shaped molded material is placed on a substrate or the like and is subjected to a second heating treatment. The heating temperature of the second heating treatment is set to 800° C. or higher and 1000° C. or lower, and sintering of the particles of the active material and formation of the crystalline first electrolyte portion are promoted. The time of the heating treatment is preferably set to, for example, 5 minutes or more and 36 hours or less, and is more preferably 4 hours or more and 14 hours or less.

According to this, an active material portion is formed from the active material, whereby an electron transfer pathway is formed, and also a positive electrode in which the active material portion (active material) and the first electrolyte portion (electrolyte) are combined is formed. Then, the process proceeds to the step S15.

Formation of Electrolyte Layer

In the step S15, an electrolyte layer is formed on one side of the positive electrode. As a forming material of the electrolyte layer, other than the solid electrolyte to be contained in the first electrolyte portion or the second electrolyte portion of the above-mentioned embodiment, for example, a known crystalline or amorphous solid electrolyte containing an oxide, a sulfide, a halide, a nitride, a hydride, a boride, or the like is exemplified.

In the formation of the electrolyte layer, for example, other than a solution process such as a so-called sol-gel method or an organometallic thermal decomposition method involving a hydrolysis reaction or the like of an organometallic compound, a CVD (Chemical Vapor Deposition) method using an appropriate metal compound and an appropriate gas atmosphere, an ALD (Atomic Layer Deposition) method, a green sheet method or a screen printing method using a slurry of solid electrolyte particles, an aerosol deposition method, a sputtering method using an appropriate target and an appropriate gas atmosphere, a PLD (Pulsed Laser Deposition) method, a flux method using a melt or a solution, or the like can be adopted.

The thickness of the electrolyte layer to be formed is preferably 0.1 μm or more and 100 μm or less, more preferably 0.2 μm or more and 10 μm or less. By setting the thickness of the electrolyte layer within the above range, the internal resistance of the electrolyte layer is decreased, and the occurrence of a short circuit between the positive electrode and the negative electrode can be suppressed. On the face in contact with the negative electrode of the electrolyte layer, a relief structure such as a trench, a grating, or a pillar may be provided by combining various molding methods and processing methods as needed. Then, the process proceeds to the step S16.

Formation of Negative Electrode

In the step S16, a negative electrode is formed on one side of the positive electrode through the electrolyte layer so as to come into contact with the electrolyte layer. In the formation of the negative electrode, the same forming material and the same forming method as in the above-mentioned embodiment can be adopted. Then, the process proceeds to the step S17.

Formation of First Current Collector

In the step S17, a first current collector is formed on the other side of the positive electrode. In the formation of the first current collector, the same forming material and the same forming method as in the above-mentioned embodiment can be adopted. For example, first, the face opposed to the face on which the negative electrode is formed is polished. At this time, by a polishing process, the active material portion is reliably exposed to form the surface. By doing this, electrical connection between the active material portion and the first current collector to be formed thereafter is ensured. In the case where the active material portion is sufficiently exposed on the face opposed to the face on which the negative electrode is formed of the positive electrode in the above-mentioned step, this polishing process may be omitted. Subsequently, the first current collector is formed using a gas phase deposition method, a wet method, or the like described above. According to this, the lithium battery of this embodiment is produced.

As described above, with the use of the method for producing a lithium battery according to this embodiment, in addition to the effects of the first embodiment, the following effect can be obtained. Since the positive electrode is directly formed from the calcined body which is the forming material of the first electrolyte portion and the active material, it is only necessary to perform the heating treatment at 800° C. or higher once, and so on, and the production step can be simplified.

Third Embodiment

Method for Producing Battery

Figure 14:
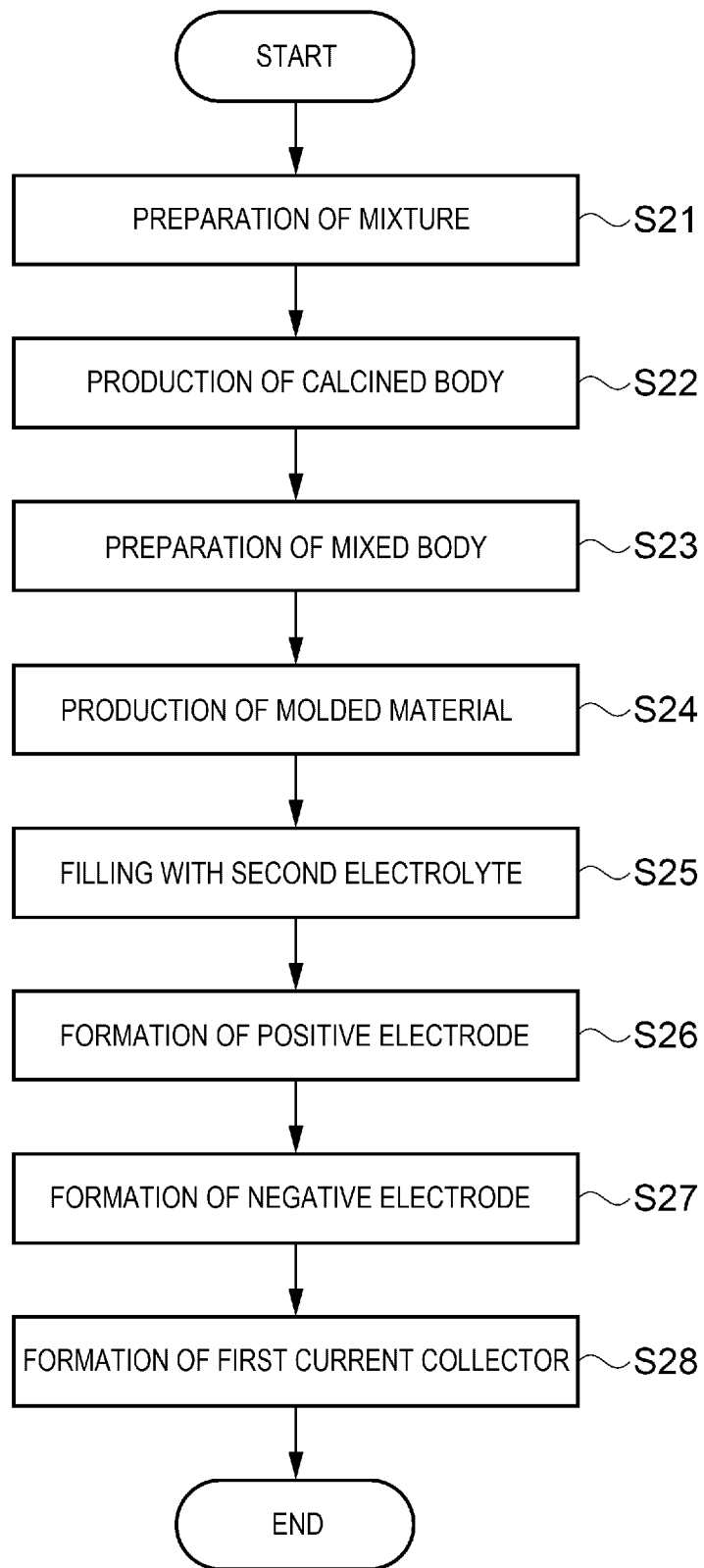
FIG. 14 is a process flowchart showing a method for producing a lithium battery as a battery according to a third embodiment.

A method for producing a lithium battery as a battery according to this embodiment will be described with reference to FIG. 14. FIG. 14 is a process flowchart showing a method for producing a lithium battery as a battery according to the third embodiment. In the production method of this embodiment, a method for producing a first electrolyte portion is included. The process flow shown in FIG. 14 is an example, and the method is not limited thereto. Further, the same reference numerals are used for the same constituent components as those of the first embodiment, and a repetitive description will be omitted.

The method for producing a lithium battery of this embodiment is similar to that of the second embodiment in that the first molded body is not formed, but is different from that of the second embodiment in that a molded material is produced from an active material and a calcined body which is a forming material of a first electrolyte portion, and a composite body (positive electrode) is formed by filling the molded material with a second electrolyte.

As shown in FIG. 14, the method for producing a lithium battery of this embodiment includes the following steps. In a step S21, a mixture is prepared by mixing a plurality of types of raw materials containing elements constituting a lithium composite metal oxide represented by the following compositional formula (1). In a step S22, a calcined body is formed by subjecting the mixture to a first heating treatment. In a step S23, a mixed body is prepared by mixing the calcined body with an active material. In a step S24, a molded material including a crystalline first electrolyte portion and the active material is produced by molding the mixed body, followed by performing a second heating treatment. In a step S25, the molded material is filled with the melt of a second electrolyte containing lithium (Li), boron (B), and oxygen (O) by melting the second electrolyte by heating in a state where the second electrolyte is brought into contact with the molded material. In a step S26, a positive electrode (composite body) including the crystalline first electrolyte portion, a second electrolyte portion, and the active material is formed by cooling the molded material filled with the melt of the second electrolyte. In a step S27, a negative electrode is formed on one side of the positive electrode through an electrolyte layer. In a step S28, a first current collector is formed on the other side of the positive electrode

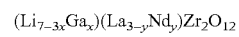  (1)

In the formula (1), x and y satisfy the following formulae: $0.1 \leq x \leq 1.0$ and $0.01 \leq y \leq 0.2$.

The step S21 and the step S22 correspond to the step S11 and the step S12 of the second embodiment and are performed in the same manner as the step S11 and the step S12, respectively.

In the step S23, a pore forming material may be added to the mixed body. By adding a pore forming material to the mixed body, a plurality of pores are easily formed in the molded material to be produced in the step S24. Therefore, it becomes possible to easily fill the melt of the second electrolyte in the formed pores. The amount of the pore forming material to be added to the mixed body is adjusted so that the bulk density of the molded body becomes about 75% or more. The step S23 is performed in the same manner as the step S13 of the second embodiment except for the above-mentioned operation.

In the step S24, a molded material is produced using the same method as the step S14 of the second embodiment.

The step S25 to the step S28 are performed in the same manner as the step S4 to the step S7 of the first embodiment. Here, in the step S27, before forming a negative electrode, an electrolyte layer may be formed on a face on which the negative electrode is to be formed of the positive electrode.

As described above, with the use of the method for producing a lithium battery according to this embodiment, in addition to the effects of the first embodiment, the following effect can be obtained. Since the molded material is directly formed from the calcined body which is the forming material of the first electrolyte portion and the active material, it is only necessary to perform the heating treatment at 800° C. or higher once, and so on, and the production step can be simplified.

Fourth Embodiment

Electronic Apparatus

Figure 15:
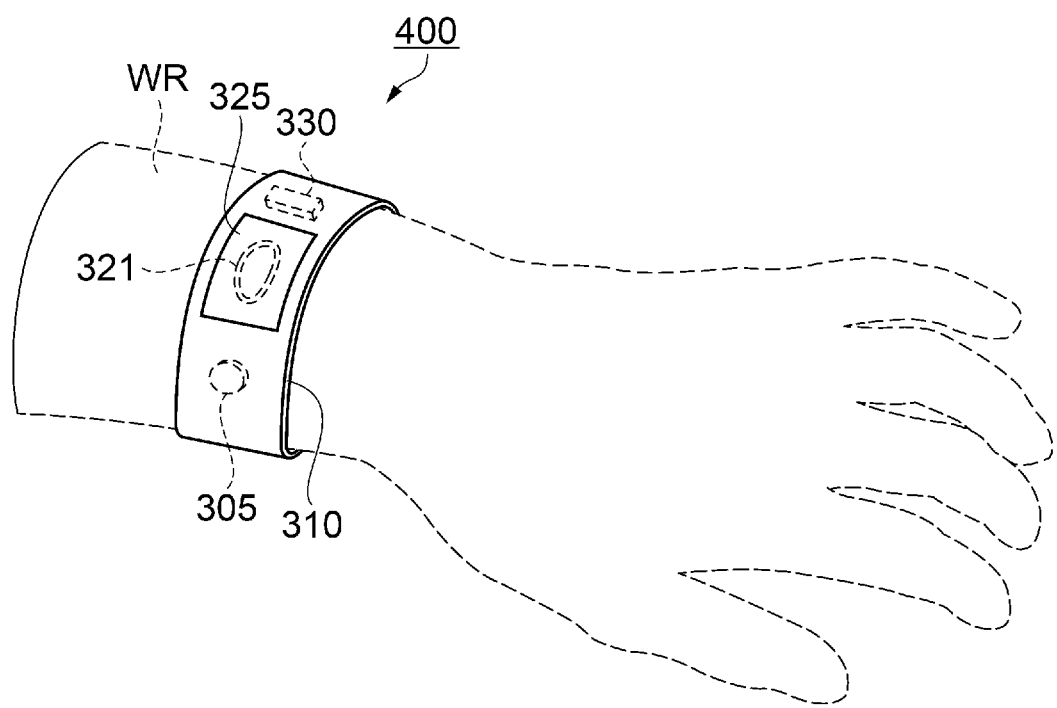
FIG. 15 is a schematic view showing a structure of a wearable apparatus according to a fourth embodiment.

An electronic apparatus according to this embodiment will be described with reference to FIG. 15. In this embodiment, a wearable apparatus will be described as an example of the electronic apparatus. FIG. 15 is a schematic view showing a structure of a wearable apparatus as the electronic apparatus according to the fourth embodiment.

As shown in FIG. 15, a wearable apparatus 400 of this embodiment is an information apparatus which is worn on, for example, the wrist WR of the human body using a band 310 like a watch, and obtains information on the human body. The wearable apparatus 400 includes a battery 305, a display portion 325, a sensor 321, and a processing portion 330. As the battery 305, the lithium battery according to the above-mentioned embodiment is used.

The band 310 has a belt-like shape using a resin having flexibility such as rubber so as to come into close contact with the wrist WR when it is worn. In an end portion of the band 310, a binding portion (not shown) capable of adjusting the binding position according to the thickness of the wrist WR is provided.

The sensor 321 is disposed in the band 310 on the inner surface side (the wrist WR side) of the band 310 so as to come into contact with the wrist WR when it is worn. The sensor 321 obtains information on the pulse rate, the blood glucose level, or the like of the human body when it comes into contact with the wrist WR, and outputs the information to the processing portion 330. As the sensor 321, for example, an optical sensor is used.

The processing portion 330 is incorporated in the band 310, and is electrically connected to the sensor 321 and the display portion 325. As the processing portion 330, for example, an integrated circuit (IC) is used. The processing portion 330 performs arithmetic processing of the pulse rate, the blood glucose level, or the like based on the output from the sensor 321, and outputs display data to the display portion 325.

The display portion 325 displays the display data such as the pulse rate or the blood glucose level output from the processing portion 330. As the display portion 325, for example, a light-receiving type liquid crystal display device is used. The display portion 325 is disposed on the outer surface side (a side opposite to the inner surface on which the sensor 321 is disposed) of the band 310 so that a wearer can read the display data when the wearer wears the wearable apparatus 400.

The battery 305 functions as a power supply source which supplies power to the display portion 325, the sensor 321, and the processing portion 330. The battery 305 is incorporated in the band 310 in an attachable and detachable manner.

According to the above configuration, the wearable apparatus 400 can obtain information on the pulse rate or the blood glucose level of a wearer from the wrist WR and can display it as information such as the pulse rate or the blood glucose level through arithmetic processing or the like. Further, to the wearable apparatus 400, the lithium battery according to the above-mentioned embodiment having an improved lithium ion conduction property and a large battery capacity in spite of having a small size is applied, and therefore, the weight can be reduced, and the operating time can be extended. In addition, since the lithium battery according to the above-mentioned embodiment is an all-solid-state secondary battery, the battery can be repeatedly used by charging, and also there is no concern about leakage of the electrolytic solution or the like, and therefore, the wearable apparatus 400 which can be used safely for a long period of time can be provided.

In this embodiment, a watch-type wearable apparatus is illustrated as the wearable apparatus 400, however, the apparatus is not limited thereto. The wearable apparatus may be a wearable apparatus to be worn on, for example, the ankle, head, ear, waist, or the like.

The electronic apparatus to which the battery 305 (the lithium battery according to the above-mentioned embodiment) is applied as the power supply source is not limited to the wearable apparatus 400. As other electronic apparatuses, for example, a display to be worn on the head such as a head-mounted display, a head-up display, a portable telephone, a portable information terminal, a notebook personal computer, a digital camera, a video camera, a music player, a wireless headphone, a portable gaming machine, and the like can be exemplified. These electronic apparatuses may have another function, for example, a data communication function, a gaming function, a recording and playback function, a dictionary function, or the like.

Further, the electronic apparatus according to this embodiment is not limited to those for general consumers and can also be applied to industrial use. In addition, the apparatus to which the lithium battery according to the above-mentioned embodiment is applied is not limited to electronic apparatuses. For example, the lithium battery according to the above-mentioned embodiment may be applied as a power supply source for a moving object. Specific examples of the moving object include automobiles, motorcycles, forklifts, and flying objects such as unmanned planes. According to this, a moving object including a battery having an improved ion conduction property as a power supply source can be provided.

The invention is not limited to the above-mentioned embodiments and various changes, modifications, etc. can be added to the above-mentioned embodiments. Modification examples will be described below.

First Modification Example

Figure 16:
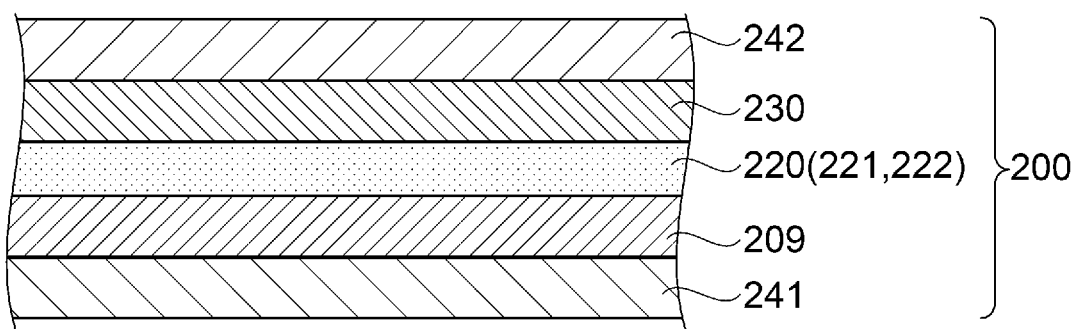
FIG. 16 is a schematic cross-sectional view showing a structure of a lithium battery as a battery according to a first modification example.

A battery according to this modification example will be described with reference to FIG. 16. In this modification example, a lithium battery will be described as an example of the battery. FIG. 16 is a schematic cross-sectional view showing a structure of a lithium battery as the battery according to the first modification example.

As shown in FIG. 16, a lithium battery 200 of this modification example includes a positive electrode 209, an electrolyte layer 220, and a negative electrode 230, which are sandwiched between a pair of current collectors 241 and 242.

The electrolyte layer 220 includes a crystalline first electrolyte portion 221 and an amorphous second electrolyte portion 222. The first electrolyte portion 221 and the second electrolyte portion 222 can be formed using the same forming material as the electrolyte of the first embodiment.

As a method for forming the electrolyte layer 220, for example, a green sheet method can be adopted. Specifically, a sheet is formed by performing calcination using a slurry containing raw materials of the first electrolyte portion 221 in the form of particles. The slurry contains a binder, a pore forming material, and the like other than the raw materials of the first electrolyte portion 221. The sheet is repeatedly dried and fired, and thereafter subjected to a heating treatment at a temperature of 800° C. or higher and 1000° C. or lower. Thereafter, the sheet is impregnated with the melt of a second electrolyte, whereby the second electrolyte portion 222 is formed. In this embodiment, the second electrolyte portion 222 is not an essential component, and the electrolyte layer 220 may be formed without forming the second electrolyte portion 222.

According to this, the amorphous second electrolyte portion 222 is filled between the particles of the first electrolyte portion 221 inside the sheet.

As a method for forming the positive electrode 209, for example, a green sheet method can be adopted. Specifically, the positive electrode 209 may be formed using the same positive electrode active material (active material 2*b*) constituting the active material portion 2 as in the first embodiment and stacked on the electrolyte layer 220 formed into a sheet shape. Similarly, as a method for forming the negative electrode 230, for example, by a green sheet method, the negative electrode 230 may be formed using the negative electrode active material constituting the negative electrode 30 of the first embodiment and stacked on the electrolyte layer 220 in the form of a sheet. The thus produced stacked body in the form of a sheet in which the positive electrode 209, the electrolyte layer 220, and the negative electrode 230 are stacked is punched into a desire size and shape, whereby a battery cell in the form of a pellet is obtained.

Examples of a method for forming the current collectors 241 and 242 on the battery cell include a method in which an appropriate adhesive layer is separately provided to adhere the current collectors 241 and 242, a gas phase deposition method such as a PVD method, a CVD method, a PLD method, an ALD method, and an aerosol deposition method, and a wet method such as a sol-gel method, an organometallic thermal decomposition method, and plating, and an appropriate method can be used according to the reactivity with the faces on which the current collectors 241 and 242 are formed, an electrical conduction property desired for the electrical circuit, and the design of the electrical circuit in the same manner as in the first embodiment. Further, as a forming material of the current collectors 241 and 242, the same forming material as in the first embodiment can be adopted. Both the current collectors 241 and 242 are not necessarily essential, and a configuration in which either one is included may be adopted.

According to the lithium battery 200 and the method for producing the lithium battery 200 described above, an excellent ion conduction property can be realized in the electrolyte layer 220, and therefore, the lithium battery 200 which is thin and has excellent battery characteristics and excellent mass productivity can be provided or produced.

Second Modification Example

In a method for producing a battery according to this modification example, after forming an active material portion (first molded body) from an active material in the form of particles, a coating of $BaTiO_3$ or $LiNbO_3$ is applied to the surface of the active material portion. This modification example is different in this point from the first embodiment in which a coating is applied to the active material in the form of particles. In this modification example, a coating of $LiNbO_3$ will be described as an example.

First, a metal compound solution for preparing an $LiNbO_3$ coating agent is prepared. As a metal compound, a solvent, a surfactant, and the like to be used in the coating agent, the same members as in the first embodiment can be adopted. Here, in this modification example, the intended thickness of the coating to be applied to the active material portion is set to about 20 nm, and therefore, the concentrations of the below-mentioned metal compound solutions and coating agent are set higher than in the first embodiment.

2-Butoxyethanol Solution of 0.20 mol/kg Lithium Nitrate

The concentration of a metal compound solution containing lithium (Li) (2-butoxyethanol solution of lithium nitrate) is changed from 0.05 mol/kg, which is the concentration in the first embodiment, to 0.20 mol/kg. Therefore, a 2-butoxyethanol solution of 0.20 mol/kg lithium nitrate was obtained in the same manner as in the first embodiment except that the blending amount of lithium nitrate was increased.

2-Butoxyethanol Solution of 0.20 mol/kg Niobium Pentaethoxide

The concentration of a metal compound solution containing niobium (Nb) (2-butoxyethanol solution of niobium pentaethoxide) is changed from 0.05 mol/kg, which is the concentration in the first embodiment, to 0.20 mol/kg. Therefore, a 2-butoxyethanol solution of 0.20 mol/kg niobium pentaethoxide was obtained in the same manner as in the first embodiment except that the blending amount of niobium pentaethoxide was increased.

Preparation of $LiNbO_3$ Coating Agent

Subsequently, as an $LiNbO_3$ coating agent, a 2-butoxyethanol solution of 0.20 mol/kg lithium niobate was prepared. Specifically, in a 50-g reagent bottle made of Pyrex (trademark of Corning Incorporated) equipped with a magnetic stirrer bar, 4.5000 g of the 2-butoxyethanol solution of 0.20 mol/kg lithium nitrate, 5.0000 g of the 2-butoxyethanol solution of 0.20 mol/kg niobium pentaethoxide, and 0.0340 g of Triton (registered trademark) X-100 (trade name, MP Biomedicals, Inc.) as a nonionic surfactant were weighed. Then, the bottle was placed on a magnetic stirrer, and stirring was performed at 350 rpm for 10 minutes at room temperature (about 20° C.) so as to achieve sufficient mixing. By doing this, a 2-butoxyethanol solution of 0.20 mol/kg lithium niobate was obtained. In consideration of the single phase formation of LiNbO$_3$, the coating agent was prepared by setting the molar ratio of lithium (Li) to 0.90 times and the molar ratio of niobium (Nb) to 1 time.

Formation of Active Material Portion

An active material portion is formed from an active material in the form of particles by a green sheet method. Specifically, as the active material, a slurry was prepared using LiCoO$_2$ subjected to a classification operation in the same manner as in the first embodiment. Subsequently, an active material portion in the form of a sheet was produced from the slurry by performing a firing treatment at 950° C. for 16 hours. At this time, the concentration of the slurry, the molding conditions for the sheet, and the like are adjusted so that the active material portion in the form of a sheet has a bulk density of about 50% and a thickness of 150 µm. Thereafter, the active material portion in the form of a sheet was processed into a pellet having a diameter of 10 mm, whereby an LiCoO$_2$ pellet (active material portion) was obtained. The method for forming the active material portion is not limited to the above-mentioned method, and the active material portion may be formed by, for example, compression molding the active material in the form of particles using the molding die used in the first embodiment, followed by performing a firing treatment.

Coating of Active Material Portion

The LiCoO$_2$ pellet is placed on a hot plate through a substrate made of silicon. By using a micropipette, 15 µL of the 2-butoxyethanol solution of 0.20 mol/kg lithium niobate (coating agent) is dropped onto the upper face of the LiCoO$_2$ pellet. The coating agent penetrates the inside of the LiCoO$_2$ pellet by capillary phenomenon, and also wets and spreads so as to cover the entire LiCoO$_2$ pellet. Then, the temperature of the hot plate was increased to 90° C. and maintained for 15 minutes to evaporate the solvent of the coating agent. Thereafter, the temperature of the hot plate was increased to 360° C. and maintained for 10 minutes, thereby burning and decomposing the organic components. Subsequently, the temperature of the hot plate was increased to 540° C. and maintained for 1 hour, thereby decomposing the remaining organic substances and coating the surface of the active material portion with LiNbO$_3$. Thereafter, the active material portion was gradually cooled to about 20° C., whereby the active material portion (LiCoO$_2$ pellet) coated with LiNbO$_3$ was obtained. The thickness of the coating on the obtained active material portion was measured by TEM (transmission electron microscope) and found to be about 20 nm.

The method for applying the coating agent to the active material portion is not limited to the above-mentioned method. As the other application methods, for example, immersion, spraying, spin coating, and the like are exemplified.

It is possible to form a lithium battery in the same manner as in the above-mentioned embodiment using the active material portion provided with the coating.

According to this modification example, an operation such as dispersion of the active material particles in the coating agent, centrifugation, etc. in the first embodiment can be omitted.

Hereinafter, the contents derived from the embodiments will be described.

An electrolyte includes a crystalline first electrolyte portion which contains a lithium composite metal oxide represented by the following compositional formula (1).

$$(Li_{7-3x}Ga_x)(La_{3-y}Nd_y)Zr_2O_{12} \tag{1}$$

In the formula (1), x and y satisfy the following formulae: $0.1 \leq x \leq 1.0$ and $0.01 \leq y \leq 0.2$.

According to this configuration, even if firing is performed at 1000° C. or lower which is a relatively low temperature for the firing temperature, the grain boundary resistance of crystal grains can be decreased and also the lithium ion conduction property can be improved. Specifically, the first electrolyte portion is a crystalline lithium composite metal oxide having the compositional formula (1) as a basic structure. That is, in the first electrolyte portion, lithium (Li) among the elements constituting the lithium composite metal oxide is partially substituted with gallium (Ga). Accordingly, in the electrolyte, the bulk lithium ion conductivity (grain bulk conductivity) can be improved.

When lithium is partially substituted with gallium, there is a tendency that coarse particles are likely to be generated. When many coarse particles are present, the contact area between the particles is decreased to decrease the lithium ion conduction property (total ion conductivity). Therefore, further, lanthanum (La) is partially substituted with neodymium (Nd). By doing this, the generation of coarse particles is suppressed, and the particle diameter can be decreased. By decreasing the particle diameter of the first electrolyte portion, the contact area between the particles is further increased when the first electrolyte portion is compression molded to form the electrolyte. Further, the small particles of the first electrolyte portion gather densely to form the electrolyte, and therefore, the grain boundary resistance can be decreased. Further, by partially substituting lanthanum with neodymium, the dielectric constant of the electrolyte is increased, whereby the lithium ion conduction property can be further improved. That is, even if firing is performed at a low temperature of 1000° C. or lower, an electrolyte in which the grain boundary resistance is decreased and the lithium ion conduction property is improved as compared with the related art can be provided.

In the electrolyte, it is preferred that the electrolyte includes an amorphous second electrolyte portion which contains Li and is in contact with the first electrolyte portion.

According to this configuration, the crystalline first electrolyte portion is joined to the amorphous second electrolyte portion, and therefore, the resistance occurring at the crystal interface of the first electrolyte portion is further decreased. In addition, the lithium ion conduction property of the electrolyte can be further improved.

In the electrolyte, it is preferred that the second electrolyte portion contains Li, B, and O.

According to this configuration, the amorphous second electrolyte portion is easily formed, and therefore, the lithium ion conduction property of the electrolyte can be still further improved.

A battery includes a composite body including the electrolyte and an active material, an electrode on one side of the composite body, and a current collector on the other side of the composite body.

According to this configuration, the electrolyte in which the grain boundary resistance is decreased and the lithium ion conduction property is improved is used, and therefore, a battery having improved charge-discharge characteristics can be formed.

In the battery, it is preferred that the active material is a positive electrode active material containing Li.

According to this configuration, the positive electrode active material to serve as a lithium supply source is included, and therefore, the charge-discharge characteristics can be further improved. Further, the capacity of the battery can be increased as compared with the related art.

An electronic apparatus includes the battery.

According to this configuration, an electronic apparatus including the battery, which has improved charge-discharge characteristics, is small, and has high quality, as a power supply source can be provided.

A method for producing an electrolyte includes a step of preparing a mixture by mixing a plurality of types of raw materials containing elements constituting a lithium composite metal oxide represented by the following compositional formula (1), and a step of forming a crystalline first electrolyte portion by subjecting the mixture to a heating treatment.

$$(Li_{7-3x}Ga_x)(La_{3-y}Nd_y)Zr_2O_{12} \qquad (1)$$

In the formula (1), x and y satisfy the following formulae: $0.1 \leq x \leq 1.0$ and $0.01 \leq y \leq 0.2$.

According to this configuration, an electrolyte in which the grain boundary resistance is decreased and the lithium ion conduction property is improved can be produced.

In the method for producing an electrolyte, it is preferred that the method includes a step of dissolving the raw materials in a solvent, the mixture contains the solvent, and the heating treatment includes a first heating treatment in which the heating temperature is 500° C. or higher and 650° C. or lower, and a second heating treatment which is performed after the first heating treatment, and in which the heating temperature is 800° C. or higher and 1000° C. or lower.

According to this configuration, the first electrolyte portion is formed by a liquid phase method. The crystal grain of the first electrolyte portion is crystallized from the solution of the mixture, and therefore, as compared with a solid phase method, the micronization of the crystal grain is facilitated. Further, by the first heating treatment, the solvent contained in the mixture or an organic substance such as an impurity is decomposed and reduced. Therefore, in the second heating treatment, the purity is increased and the first electrolyte portion can be formed. Further, by setting the temperature of the heating treatment to 1000° C. or lower, the occurrence of a side reaction at the crystal grain boundary or volatilization of lithium can be suppressed. Accordingly, an electrolyte in which the lithium ion conduction property is further improved can be produced.

In the method for producing an electrolyte, it is preferred that the method includes a step of melting a second electrolyte containing Li, B, and O by heating in a state where the second electrolyte is brought into contact with the first electrolyte portion, and a step of forming a second electrolyte portion which is in contact with the first electrolyte portion by cooling the melt of the second electrolyte.

According to this configuration, the amorphous second electrolyte portion is easily formed in contact with the first electrolyte portion, and therefore, the electrolyte in which the lithium ion conduction property is still further improved can be produced.

A method for producing a battery includes a step of preparing a mixture by dissolving a plurality of types of raw materials containing elements constituting a lithium composite metal oxide represented by the following compositional formula (1) in a solvent, followed by mixing, a step of forming a first molded body using an active material, a step of forming a composite body which includes the first molded body and a crystalline first electrolyte portion obtained after a reaction by subjecting the mixture to a heating treatment in a state of being impregnated into the first molded body to cause a reaction, a step of forming an electrode on one side of the composite body, and a step of forming a current collector on the other side of the composite body.

$$(Li_{7-3x}Ga_x)(La_{3-y}Nd_y)Zr_2O_{12} \qquad (1)$$

In the formula (1), x and y satisfy the following formulae: $0.1 \leq x \leq 1.0$ and $0.01 \leq y \leq 0.2$.

According to this configuration, the composite body is produced by forming the first electrolyte portion in the inside including the surface of the first molded body which includes the active material by a liquid phase method. Therefore, the composite body is formed such that the active material and the first electrolyte portion are in contact with each other. The composite body having such a configuration can be easily produced, and also a battery in which the grain boundary resistance of the electrolyte is decreased and the lithium ion conduction property is improved by the configuration can be produced.

A method for producing a battery includes a step of preparing a mixture by dissolving a plurality of types of raw materials containing elements constituting a lithium composite metal oxide represented by the following compositional formula (1) in a solvent, followed by mixing, a step of forming a first molded body using an active material, a step of forming a second molded body which includes the first molded body and a crystalline first electrolyte portion obtained after a reaction by subjecting the mixture to a heating treatment in a state of being impregnated into the first molded body to cause a reaction, a step of filling the second molded body with the melt of a second electrolyte containing Li, B, and O by melting the second electrolyte by heating in a state where the second electrolyte is brought into contact with the second molded body, a step of forming a composite body which includes the first electrolyte portion, a second electrolyte portion, and the active material by cooling the second molded body filled with the melt of the second electrolyte, a step of forming an electrode on one side of the composite body, and a step of forming a current collector on the other side of the composite body.

$$(Li_{7-3x}Ga_x)(La_{3-y}Nd_y)Zr_2O_{12} \qquad (1)$$

In the formula (1), x and y satisfy the following formulae: $0.1 \leq x \leq 1.0$ and $0.01 \leq y \leq 0.2$.

According to this configuration, the second molded body is produced by forming the first electrolyte portion in the inside including the surface of the first molded body which includes the active material by a liquid phase method. Further, the composite body is produced by filling the melt of the second electrolyte in the inside including the surface of the second molded body. Therefore, the composite body is formed such that the active material and the first electrolyte portion are in contact with each other, and the first electrolyte portion and the second electrolyte portion are in contact with each other. The composite body having such a configuration can be easily produced, and also a battery in which the grain boundary resistance of the electrolyte is decreased and the lithium ion conduction property is improved by the configuration can be produced.

In the method for producing a battery, it is preferred that the heating treatment includes a first heating treatment in which the heating temperature is 500° C. or higher and 650° C. or lower, and a second heating treatment which is performed after the first heating treatment, and in which the heating temperature is 800° C. or higher and 1000° C. or lower.

According to this configuration, by the first heating treatment, the solvent contained in the mixture or an organic substance such as an impurity is decomposed and reduced. Therefore, in the second heating treatment, the purity is increased and the first electrolyte portion can be formed. Further, by setting the temperature of the heating treatment to 1000° C. or lower, the occurrence of a side reaction at the crystal grain boundary or volatilization of lithium can be suppressed. Accordingly, a battery in which the lithium ion conduction property is further improved can be produced.

A method for producing a battery includes a step of preparing a mixture by mixing a plurality of types of raw materials containing elements constituting a lithium composite metal oxide represented by the following compositional formula (1), a step of producing a calcined body by subjecting the mixture to a first heating treatment, a step of preparing a mixed body by mixing the calcined body with an active material, a step of forming a composite body which includes a crystalline first electrolyte portion and the active material by molding the mixed body, followed by performing a second heating treatment, a step of forming an electrode on one side of the composite body, and a step of forming a current collector on the other side of the composite body.

$$(Li_{7-3x}Ga_x)(La_{3-y}Nd_y)Zr_2O_{12} \tag{1}$$

In the formula (1), x and y satisfy the following formulae: $0.1 \le x \le 1.0$ and $0.01 \le y \le 0.2$.

According to this configuration, the composite body is directly formed from the calcined body which is the forming material of the first electrolyte portion and the active material, and therefore, the production step can be simplified.

A method for producing a battery includes a step of preparing a mixture by mixing a plurality of types of raw materials containing elements constituting a lithium composite metal oxide represented by the following compositional formula (1), a step of producing a calcined body by subjecting the mixture to a first heating treatment, a step of preparing a mixed body by mixing the calcined body with an active material, a step of producing a molded material by molding the mixed body, followed by performing a second heating treatment, a step of filling the molded material with the melt of a second electrolyte containing Li, B, and O by melting the second electrolyte by heating in a state where the second electrolyte is brought into contact with the molded material, a step of forming a composite body which includes a crystalline first electrolyte portion, a second electrolyte portion, and the active material by cooling the molded material filled with the melt of the second electrolyte, a step of forming an electrode on one side of the composite body, and a step of forming a current collector on the other side of the composite body.

$$(Li_{7-3x}Ga_x)(La_{3-y}Nd_y)Zr_2O_{12} \tag{1}$$

In the formula (1), x and y satisfy the following formulae: $0.1 \le x \le 1.0$ and $0.01 \le y \le 0.2$.

According to this configuration, the molded material is directly formed from the calcined body which is the forming material of the first electrolyte portion and the active material by the method for producing a battery. Therefore, the production step can be simplified.

In the method for producing a battery, it is preferred that in the first heating treatment, the heating temperature is 500° C. or higher and 650° C. or lower, and in the second heating treatment, the heating temperature is 800° C. or higher and 1000° C. or lower.

According to this configuration, by the first heating treatment, the solvent contained in the mixture or an organic substance such as an impurity is decomposed and reduced. Therefore, in the second heating treatment, the purity is increased and the first electrolyte portion can be formed. Further, by setting the temperature of the heating treatment to 1000° C. or lower, the occurrence of a side reaction at the crystal grain boundary or volatilization of lithium can be suppressed. Accordingly, a battery in which the lithium ion conduction property is further improved can be produced.

What is claimed is:

1. A composite body, comprising:
    an electrolyte which contains Li, La, Zr, O, Nd, and Ga; and
    an active material coated with barium titanate ($BaTiO_3$) or lithium niobate ($LiNbO_3$).

2. The composite body according to claim 1, wherein the electrolyte comprises a crystalline first electrolyte portion which contains a lithium composite metal oxide represented by the following compositional formula (1):

$$(Li_{7-3x}Ga_x)(La_{3-y}Nd_y)Zr_2O_{12} \tag{1}$$

where x and y satisfy the following formulae: $0.1 \le x \le 1.0$ and $0.01 \le y \le 0.2$.

3. The composite body according to claim 2, wherein the electrolyte further comprises an amorphous second electrolyte portion which contains Li and is in contact with the first electrolyte portion.

4. The composite body according to claim 3, wherein the second electrolyte portion contains Li, B, and O.

5. The composite body according to claim 1, wherein the active material is a positive electrode active material containing Li.

6. A battery comprising;
    the composite body according to claim 1; and
    an electrode provided on one face of the composite body; and
    a current collector provided on the other face of the composite body.

* * * * *